(12) United States Patent
Stine et al.

(10) Patent No.: US 12,485,347 B2
(45) Date of Patent: Dec. 2, 2025

(54) SYSTEMS AND METHODS FOR PROCEDURALLY ANIMATING A VIRTUAL CAMERA ASSOCIATED WITH PLAYER-CONTROLLED AVATARS IN VIDEO GAMES

(71) Applicant: Activision Publishing, Inc., Santa Monica, CA (US)

(72) Inventors: Matthew John Stine, Los Angeles, CA (US); Cody Palmatier Pierson, Granada Hills, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 25 days.

(21) Appl. No.: 17/095,421

(22) Filed: Nov. 11, 2020

(65) Prior Publication Data

US 2022/0143502 A1  May 12, 2022

(51) Int. Cl.
*A63F 13/525* (2014.01)
*G06T 13/80* (2011.01)

(52) U.S. Cl.
CPC .......... *A63F 13/525* (2014.09); *G06T 13/80* (2013.01); *G06T 2200/24* (2013.01)

(58) Field of Classification Search
CPC .......... A63F 13/525; A63F 2300/6661; G06T 13/80; G06T 2300/24
See application file for complete search history.

(56) References Cited

U.S. PATENT DOCUMENTS

| | | |
|---|---|---|
| 5,530,796 A | 6/1996 | Wang |
| 5,561,736 A | 10/1996 | Moore |
| 5,563,946 A | 10/1996 | Cooper |
| 5,685,775 A | 11/1997 | Bakoglu |
| 5,706,507 A | 1/1998 | Schloss |
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,768,511 A | 6/1998 | Galvin |
| 5,825,877 A | 10/1998 | Dan |
| 5,835,692 A | 11/1998 | Cragun |

(Continued)

FOREIGN PATENT DOCUMENTS

| | | |
|---|---|---|
| AU | 768367 | 3/2004 |
| AU | 2005215048 | 10/2011 |

(Continued)

*Primary Examiner* — Robert E Mosser
(74) *Attorney, Agent, or Firm* — Novel IP

(57) ABSTRACT

Systems and methods are described for imparting dynamic, non-linear and realistic movement and look and feel to a player's/virtual character's first-person limbs and hand-held object model, and procedurally animating a first-person virtual camera such that it simulates the movement of a camera handheld by the player/virtual character. To impart chaotic or random motion to the first-person limbs and hand-held object model a first module defines and implements first and second two dimensional mass-spring-damper systems, each of which is linked to the player's/virtual vector's view vector. Procedural animation or rotational shake is implemented by a second module by applying a coherent noise function to each of the six axes of the first-person virtual camera.

20 Claims, 11 Drawing Sheets

(56) References Cited

U.S. PATENT DOCUMENTS

| | | | |
|---|---|---|---|
| 5,878,233 | A | 3/1999 | Schloss |
| 5,883,628 | A | 3/1999 | Mullaly |
| 5,900,879 | A | 5/1999 | Berry |
| 5,903,266 | A | 5/1999 | Berstis |
| 5,903,271 | A | 5/1999 | Bardon |
| 5,911,045 | A | 6/1999 | Leyba |
| 5,920,325 | A | 7/1999 | Morgan |
| 5,923,324 | A | 7/1999 | Berry |
| 5,969,724 | A | 10/1999 | Berry |
| 5,977,979 | A | 11/1999 | Clough |
| 5,990,888 | A | 11/1999 | Blades |
| 6,014,145 | A | 1/2000 | Bardon |
| 6,025,839 | A | 2/2000 | Schell |
| 6,059,842 | A | 5/2000 | Dumarot |
| 6,069,632 | A | 5/2000 | Mullaly |
| 6,081,270 | A | 6/2000 | Berry |
| 6,081,271 | A | 6/2000 | Bardon |
| 6,091,410 | A | 7/2000 | Lection |
| 6,094,196 | A | 7/2000 | Berry |
| 6,098,056 | A | 8/2000 | Rusnak |
| 6,104,406 | A | 8/2000 | Berry |
| 6,111,581 | A | 8/2000 | Berry |
| 6,134,588 | A | 10/2000 | Guenthner |
| 6,144,381 | A | 11/2000 | Lection |
| 6,148,328 | A | 11/2000 | Cuomo |
| 6,185,614 | B1 | 2/2001 | Cuomo |
| 6,201,881 | B1 | 3/2001 | Masuda |
| 6,222,551 | B1 | 4/2001 | Schneider |
| 6,271,842 | B1 | 8/2001 | Bardon |
| 6,271,843 | B1 | 8/2001 | Lection |
| 6,282,547 | B1 | 8/2001 | Hirsch |
| 6,311,206 | B1 | 10/2001 | Malkin |
| 6,334,141 | B1 | 12/2001 | Varma |
| 6,336,134 | B1 | 1/2002 | Varma |
| 6,337,700 | B1 | 1/2002 | Kinoe |
| 6,353,449 | B1 | 3/2002 | Gregg |
| 6,356,297 | B1 | 3/2002 | Cheng |
| 6,411,312 | B1 | 6/2002 | Sheppard |
| 6,426,757 | B1 | 7/2002 | Smith |
| 6,445,389 | B1 | 9/2002 | Bossen |
| 6,452,593 | B1 | 9/2002 | Challener |
| 6,462,760 | B1 | 10/2002 | Cox, Jr. |
| 6,469,712 | B1 | 10/2002 | Hilpert, Jr. |
| 6,473,085 | B1 | 10/2002 | Brock |
| 6,499,053 | B1 | 12/2002 | Marquette |
| 6,505,208 | B1 | 1/2003 | Kanevsky |
| 6,525,731 | B1 | 2/2003 | Suits |
| 6,549,933 | B1 | 4/2003 | Barrett |
| 6,567,109 | B1 | 5/2003 | Todd |
| 6,618,751 | B1 | 9/2003 | Challenger |
| RE38,375 | E | 12/2003 | Herzberg |
| 6,657,617 | B2 | 12/2003 | Paolini |
| 6,657,642 | B1 | 12/2003 | Bardon |
| 6,684,255 | B1 | 1/2004 | Martin |
| 6,699,127 | B1 * | 3/2004 | Lobb ............ A63F 13/807 463/43 |
| 6,717,600 | B2 | 4/2004 | Dutta |
| 6,734,884 | B1 | 5/2004 | Berry |
| 6,765,596 | B2 | 7/2004 | Lection |
| 6,781,607 | B1 | 8/2004 | Benham |
| 6,819,669 | B2 | 11/2004 | Rooney |
| 6,832,239 | B1 | 12/2004 | Kraft |
| 6,836,480 | B2 | 12/2004 | Basso |
| 6,886,026 | B1 | 4/2005 | Hanson |
| 6,948,168 | B1 | 9/2005 | Kuprionas |
| RE38,865 | E | 11/2005 | Dumarot |
| 6,993,596 | B2 | 1/2006 | Hinton |
| 7,028,296 | B2 | 4/2006 | Irfan |
| 7,062,533 | B2 | 6/2006 | Brown |
| 7,143,409 | B2 | 11/2006 | Herrero |
| 7,209,137 | B2 | 4/2007 | Brokenshire |
| 7,230,616 | B2 | 6/2007 | Taubin |
| 7,249,123 | B2 | 7/2007 | Elder |
| 7,263,511 | B2 | 8/2007 | Bodin |
| 7,287,053 | B2 | 10/2007 | Bodin |
| 7,305,438 | B2 | 12/2007 | Christensen |
| 7,308,476 | B2 | 12/2007 | Mannaru |
| 7,403,202 | B1 | 7/2008 | Nash |
| 7,404,149 | B2 | 7/2008 | Fox |
| 7,426,538 | B2 | 9/2008 | Bodin |
| 7,427,980 | B1 | 9/2008 | Partridge |
| 7,428,588 | B2 | 9/2008 | Berstis |
| 7,429,987 | B2 | 9/2008 | Leah |
| 7,436,407 | B2 | 10/2008 | Doi |
| 7,439,975 | B2 | 10/2008 | Hsu |
| 7,443,393 | B2 | 10/2008 | Shen |
| 7,447,996 | B1 | 11/2008 | Cox |
| 7,467,181 | B2 | 12/2008 | McGowan |
| 7,475,354 | B2 | 1/2009 | Guido |
| 7,478,127 | B2 | 1/2009 | Creamer |
| 7,484,012 | B2 | 1/2009 | Hinton |
| 7,503,007 | B2 | 3/2009 | Goodman |
| 7,506,264 | B2 | 3/2009 | Polan |
| 7,515,136 | B1 | 4/2009 | Kanevsky |
| 7,525,964 | B2 | 4/2009 | Astley |
| 7,552,177 | B2 | 6/2009 | Kessen |
| 7,565,650 | B2 | 7/2009 | Bhogal |
| 7,571,224 | B2 | 8/2009 | Childress |
| 7,571,389 | B2 | 8/2009 | Broussard |
| 7,580,888 | B2 | 8/2009 | Ur |
| 7,596,596 | B2 | 9/2009 | Chen |
| 7,640,587 | B2 | 12/2009 | Fox |
| 7,667,701 | B2 | 2/2010 | Leah |
| 7,698,656 | B2 | 4/2010 | Srivastava |
| 7,702,784 | B2 | 4/2010 | Berstis |
| 7,714,867 | B2 | 5/2010 | Doi |
| 7,719,532 | B2 | 5/2010 | Schardt |
| 7,719,535 | B2 | 5/2010 | Tadokoro |
| 7,734,691 | B2 | 6/2010 | Creamer |
| 7,737,969 | B2 | 6/2010 | Shen |
| 7,743,095 | B2 | 6/2010 | Goldberg |
| 7,747,679 | B2 | 6/2010 | Galvin |
| 7,765,478 | B2 | 7/2010 | Reed |
| 7,768,514 | B2 | 8/2010 | Pagan |
| 7,773,087 | B2 | 8/2010 | Fowler |
| 7,774,407 | B2 | 8/2010 | Daly |
| 7,782,318 | B2 | 8/2010 | Shearer |
| 7,792,263 | B2 | 9/2010 | Bruce |
| 7,792,801 | B2 | 9/2010 | Hamilton, II |
| 7,796,128 | B2 | 9/2010 | Radzikowski |
| 7,808,500 | B2 | 10/2010 | Shearer |
| 7,814,152 | B2 | 10/2010 | McGowan |
| 7,827,318 | B2 | 11/2010 | Hinton |
| 7,843,471 | B2 | 11/2010 | Doan |
| 7,844,663 | B2 | 11/2010 | Boutboul |
| 7,847,799 | B2 | 12/2010 | Taubin |
| 7,856,469 | B2 | 12/2010 | Chen |
| 7,873,485 | B2 | 1/2011 | Castelli |
| 7,882,222 | B2 | 2/2011 | Dolbier |
| 7,882,243 | B2 | 2/2011 | Ivory |
| 7,884,819 | B2 | 2/2011 | Kuesel |
| 7,886,045 | B2 | 2/2011 | Bates |
| 7,890,623 | B2 | 2/2011 | Bates |
| 7,893,936 | B2 | 2/2011 | Shearer |
| 7,904,829 | B2 | 3/2011 | Fox |
| 7,921,128 | B2 | 4/2011 | Hamilton, II |
| 7,940,265 | B2 | 5/2011 | Brown |
| 7,945,620 | B2 | 5/2011 | Bou-Ghannam |
| 7,945,802 | B2 | 5/2011 | Hamilton, II |
| 7,970,837 | B2 | 6/2011 | Lyle |
| 7,970,840 | B2 | 6/2011 | Cannon |
| 7,985,138 | B2 | 7/2011 | Acharya |
| 7,990,387 | B2 | 8/2011 | Hamilton, II |
| 7,996,164 | B2 | 8/2011 | Hamilton, II |
| 8,001,161 | B2 | 8/2011 | George |
| 8,004,518 | B2 | 8/2011 | Fowler |
| 8,005,025 | B2 | 8/2011 | Bodin |
| 8,006,182 | B2 | 8/2011 | Bates |
| 8,013,861 | B2 | 9/2011 | Hamilton, II |
| 8,018,453 | B2 | 9/2011 | Fowler |
| 8,018,462 | B2 | 9/2011 | Bhogal |
| 8,019,797 | B2 | 9/2011 | Hamilton, II |
| 8,019,858 | B2 | 9/2011 | Bauchot |
| 8,022,948 | B2 | 9/2011 | Garbow |

(56) References Cited

U.S. PATENT DOCUMENTS

| | | |
|---|---|---|
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | Mcvey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | Bruce |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,142,034 B2 | 9/2015 | Hoof |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 10,410,418 B2 * | 9/2019 | Kiuchi .................. G06T 19/006 |
| 10,489,986 B2 | 11/2019 | Kaifosh |
| 10,902,618 B2 | 1/2021 | Payne |
| 2004/0157662 A1 | 8/2004 | Tsuchiya |
| 2004/0176164 A1 | 9/2004 | Kobayashi |
| 2004/0219980 A1 * | 11/2004 | Bassett .................. A63F 13/10 463/6 |
| 2004/0224761 A1 | 11/2004 | Nishimura |
| 2005/0009602 A1 | 1/2005 | Nishimura |
| 2006/0246968 A1 | 11/2006 | Dyke-Wells |
| 2009/0113448 A1 | 4/2009 | Smith |
| 2009/0135187 A1 | 5/2009 | Lee |
| 2009/0262112 A1 | 10/2009 | Yoshimura |
| 2010/0166056 A1 | 7/2010 | Perlman |
| 2014/0002580 A1 | 1/2014 | Bear |
| 2014/0113718 A1 | 4/2014 | Norman |
| 2014/0125576 A1 | 5/2014 | Asuke |
| 2014/0213353 A1 | 7/2014 | Lee |
| 2014/0344725 A1 | 11/2014 | Bates |
| 2016/0191671 A1 | 6/2016 | Dawson |
| 2017/0157512 A1 | 6/2017 | Long |
| 2018/0161682 A1 | 6/2018 | Myhill |
| 2019/0083885 A1 | 3/2019 | Yee |
| 2019/0351325 A1 | 11/2019 | Spradling |
| 2019/0366211 A1 | 12/2019 | Suzuki |
| 2020/0038755 A1 | 2/2020 | Kojima |
| 2021/0093969 A1 | 4/2021 | Mccoy |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |

(56) References Cited

FOREIGN PATENT DOCUMENTS

| | | |
|---|---|---|
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

\* cited by examiner

200b

203a: The virtual character's current view vector angular velocity is smoothed in each axis using a function. The smoothing process generates a "smoothed view velocity".

→

203b: Data corresponding to parameters of 'in max view speed', 'out max dead zone size' and 'view speed to dead zone size' are used to perform a nonlinear mapping from the "smoothed view velocity" to a "goal dead zone size".

→

203c: After calculating the "goal dead zone size", smoothing is performed from the "current dead zone size" toward the "goal dead zone size".

→

203d: The game is rendered in accordance with the determined "goal dead zone size"

| | | | |
|---|---|---|---|
| 402 — | Advanced Hip Sway | | |
| | ☑ Enable Advanced Hip Sway | | |
| | Torso Orientation | | 400a |
| 406 — | Deadzone Blend Duration | 0.02 | |
| 408 — | View Speed to Deadzone Size | swaySpeedToDeadzone.rmb [...] [Open] | |

|  | Pitch | Yaw |
|---|---|---|
| 410 — IN Max View Speed | 250 | 250 |
| 412 — OUT Max Deadzone Speed | 7 | 9 |
| 414 — Deadzone Adjust Rate | 2000 | 2000 |
| 416 — Mass | 1.5 | 1.5 |
| 418 — Spring Constants | 100 | 100 |
| 420 — Damper Constants | 10 | 10 |

Gun Orientation — 400b

| | |
|---|---|
| 422 — Gun Orient Blend Duration | 0.02 |
| 424 — View Speed to Gun Offset | swaySpeedToGunOffset.rmb [...] [Open] |

|  | Pitch | Yaw |
|---|---|---|
| 426 — IN Max View Speed | 250 | 250 |
| 428 — OUT Max Gun Offset | 9 | 11 |
| 430 — Mass | 1.7 | 1.7 |
| 432 — Spring Constants | 100 | 100 |
| 434 — Damper Constants | 10 | 10 |

|  | X | Y | Z |
|---|---|---|---|
| 436 — Gun Pivot Point | 4 | -2.5 | -2.5 |
| 438 — Yaw-to-Roll Scale | -0.3 | | |

Fire Blending — 400c

| | |
|---|---|
| 440 — Fire Duration | 0.3 |
| 442 — Fire Start Blend Duration | 0.2 |
| 444 — Fire Finish Blend Duration | 0.2 |
| 446 — Fire Smoothing Rate | 70 |
| 448 — Fire Torso Deadzone Scale | 0.5 |
| 450 — Fire Torso-to-Gun Scale | 0.5 |

Constant Camera Shake (Rotation)
Defines constant handheld camera rotational motion.
- 501 — ☑ Rotational Shake Enabled

| | Pitch | Yaw | Roll |
|---|---|---|---|
| 502 — Frequency | 0.5 | 0.5 | 0.65 |
| 504 — Amplitude | 0.13 | 0.1 | 0.005 |
| 506 — Persistence / Roughness | 0.3 | 0.3 | 0.3 |

508 — View-Move Scale Comt: [Maximum ▼]

*500a*

Movement Speed Modifiers
Defines modifiers to frequency, amplitude, and persistence with player movement. Uses 'RumbleGraph' assets to define a nonlinear mapping.

- 510 — Modifier: [Speed Control ▼]
- 512 — Non-Linear Map (RumbleGraph): handheld_rotation_move.rmb [...] [Open]
- 514 — IN Speed Blend in Time: 0
- 516 — IN Speed Blend Out Time: 0

| | Min | Max |
|---|---|---|
| 518 — IN Player Move Speed | 0 | 300 |
| 520 — OUT Frequency Scale | 1 | 9.8 |
| 522 — OUT Amplitude Scale | 1 | 1.5 |
| 524 — OUT Persistence Scale | 1 | 0.7 |

- 526 — OUT Blend In Time: 0.2
- 528 — OUT Blend Out Time: 0.15

*500b*

View Speed Modifiers
Defines modifiers to frequency, amplitude, and persistence with player movement. Uses 'RumbleGraph' assets to define a nonlinear mapping.

- 530 — Modifier: [Speed Control ▼]
- 532 — Non-Linear Map (RumbleGraph): handheld_rotation_view.rmb [...] [Open]
- 534 — IN Speed Blend in Time: 0.0
- 536 — IN Speed Blend Out Time: 0.00

| | Min | Max |
|---|---|---|
| 538 — IN Player View Speed | 0 | 250 |
| 540 — OUT Frequency Scale | 1 | 7.5 |
| 542 — OUT Amplitude Scale | 1 | 1.1 |
| 544 — OUT Persistence Scale | 1 | 1.4 |

- 546 — OUT Blend In Time: 0.15
- 548 — OUT Blend Out Time: 0.2

SYSTEMS AND METHODS FOR PROCEDURALLY ANIMATING A VIRTUAL CAMERA ASSOCIATED WITH PLAYER-CONTROLLED AVATARS IN VIDEO GAMES

FIELD

The present specification is related generally to the field of video games and graphics processing. More specifically, the present specification is related to procedurally animating a first-person virtual camera, manipulated by a human player in a video game, such that it simulates the use of a camera handheld by a virtual character.

BACKGROUND

Conventionally, in first-person video games, a virtual character's arms often appear static, linear and/or mechanical during gameplay. In contrast, the movement of a person's arms and/or handheld objects in the real world appears quite natural when viewing video feeds generated using camera handheld by or attached to a helmet of the person. Such realism is embodied in the fluid flow of the limbs or objects, a realistic shaking of the camera, and overall haphazard motion associated with the generated video feeds using such a handheld or helmet-attached camera.

One problem with trying to reproduce a realistic movement of a virtual character's first-person limbs in a video game is that the moment the human player starts causing the virtual character to turn, the video game has difficulty with predicting where the human player might want the virtual character to land, since the intent of the human player is not known. This uncertainty, among other reasons, makes it hard to mimic, recreate, or otherwise reproduce the kind of natural movement which would be expected in an analogous real-world situation.

One conventional approach uses a 2D (two-dimensional) animation blend space in which animators may create a multitude of animation poses for the player's arms on a 2D grid. The player's yaw and pitch speed could then be mapped to matching poses on the grid and extract matched animation poses. However, this approach still has a substantial linear feeling when viewing a virtual character's limbs, instead of the dynamic natural feeling desired.

Another conventional approach uses a concept of motion mapping where a substantial amount of pre-shot motion capture data is taken from actors and input it into a database. Once in the database, that data is then extracted at runtime, depending on what the human player is trying to do in video game, and blended together. While the second approach is more advanced than the first approach, it still generates a linear look and feel to the first-person limbs of the virtual character. It is also not a cost-effective approach since it takes a lot of time to capture raw animation data from actors. Further, there is limited design control over the final look because this approach is restricted to what the actors did during motion capture sessions.

Accordingly, there is a need for systems and methods that enable a virtual character's first-person limb movement look more cinematic, as if the human player is viewing himself from a first-person camera attached to his helmet. There is also a need for a virtual character's movement of limbs and hand-held objects to be perceived, by the human player from a first-person vantage point, as being sufficiently chaotic or random, thereby imparting a dynamic, non-linear and/or natural look to the virtual character's movements. Finally, there is a need to procedurally animate a virtual camera associated with the human player such that it simulates the use of a camera handheld by or attached to a helmet of the virtual character.

SUMMARY

The following embodiments and aspects thereof are described and illustrated in conjunction with systems, tools and methods, which are meant to be exemplary and illustrative, not limiting in scope. The present application discloses numerous embodiments.

In some embodiments, the present specification discloses a method of determining an orientation of a virtual character's first-person arms and object as the virtual character is turned by a player during gameplay, wherein the virtual character is characterized by a torso having a torso mass and a torso anchor and wherein the object is held by the virtual character and characterized by an object mass and an object anchor, the method being implemented by at least one server executing a plurality of programmatic instructions and comprising: determining a current torso anchor orientation from a view vector orientation of the virtual character and view vector angular velocity of the virtual character; determining a current torso mass orientation based on the current torso anchor orientation; determining a current object anchor orientation from the view vector angular velocity and the current torso mass orientation; determining a current object mass orientation based on the current object anchor orientation; determining a first angular offset between the current torso mass orientation and the view vector orientation in order to pivot the first-person arms and object near a shoulder of the virtual character; and determining a second angular offset between the current object mass orientation and the view vector orientation to pivot the first-person arms and object at a point on the object.

In some embodiments, the present specification discloses a method of determining an orientation of a virtual character's first-person arms and object as the virtual character is turned by a player during gameplay, wherein the virtual character is characterized by a torso having a torso mass and a torso anchor and wherein the object is held by the virtual character and characterized by an object mass and an object anchor, the method being implemented by at least one server executing a plurality of programmatic instructions and comprising: determining a current torso anchor orientation from a view vector orientation of the virtual character and view vector angular velocity of the virtual character; determining a current torso mass orientation based on the current torso anchor orientation; determining a current object anchor orientation from the view vector angular velocity and the current torso mass orientation; determining a current object mass orientation based on the current object anchor orientation; determining a first angular offset between the current torso mass orientation and a screen position in order to pivot the first-person arms and object near a shoulder of the virtual character; and determining a second angular offset between the current object mass orientation and the screen position to pivot the first-person arms and object at a point on the object.

In some embodiments, the present specification discloses a method of determining an orientation of a virtual character's first-person arms and object as the virtual character is turned by a player during gameplay, wherein the virtual character is characterized by a torso having a torso mass and a torso anchor and wherein the object is held by the virtual character and characterized by an object mass and an object anchor, the method being implemented by at least one server executing a plurality of programmatic instructions and comprising: determining a current torso anchor orientation from a view vector orientation of the virtual character and view vector angular velocity of the virtual character; determining a current torso mass orientation based on the current torso anchor orientation; determining a current object anchor orientation from the view vector angular velocity and the current torso mass orientation; determining a current object mass orientation based on the current object anchor orientation; determining a first angular offset between the current torso mass orientation and a screen center in order to pivot the first-person arms and object near a shoulder of the virtual character; and determining a second angular offset between the current object mass orientation and the view vector orientation to pivot the first-person arms and object at a point on the object.

Optionally, the current torso anchor orientation is aligned with the view vector orientation while the view vector angular velocity is zero.

Optionally, when the virtual character has a non-zero view vector angular velocity, a dead zone is generated around the view vector orientation, and further comprising dragging the current torso anchor orientation as the virtual character's view vector orientation turns when the current torso anchor orientation hits a wall of the dead zone.

Optionally, a size of the dead zone is a function of the view vector angular velocity.

Optionally, the current torso mass orientation is connected to the current torso anchor orientation by a first two-dimensional mass-spring-damper system and wherein the first two-dimensional mass-spring-damper system determines a first value indicative of a pitch and a second value indicative of a yaw.

Optionally, the current torso mass orientation is connected to the current torso anchor orientation by a first two-dimensional mass-spring-damper system and wherein the first two-dimensional mass-spring-damper system determines a first value indicative of a pitch and a second value indicative of a yaw in Euler angles.

Optionally, the current object anchor orientation is determined by adding a third angular offset to the current torso mass orientation.

Optionally, the third angular offset is determined by scaling the view vector angular velocity in a corresponding axis.

Optionally, the current object anchor orientation leads the current torso mass orientation in a direction of turning of the virtual character.

Optionally, the current object mass orientation is connected to the current object anchor orientation by a second two-dimensional mass-spring-damper system, wherein the second two-dimensional mass-spring-damper system determine as a third value indicative of a pitch and a fourth value indicative of a yaw.

Optionally, the current object mass orientation is connected to the current object anchor orientation by a second two-dimensional mass-spring-damper system, wherein the second two-dimensional mass-spring-damper system determine as a third value indicative of a pitch and a fourth value indicative of a yaw in Euler angles.

Optionally, the method further comprises applying the first angular offset as a rotation to the first-person arms and the object at the virtual character's shoulder.

Optionally, the method further comprises applying the second angular offset as a rotation to the first-person arms and the object at the point on the object.

Optionally, the module is configured to generate at least one graphical user interface that displays a first plurality of parameters directed towards customizing the an orientation of the torso, a second plurality of parameters directed towards customizing the an orientation of the object and a third plurality of parameters directed towards customizing characteristics of the first two-dimensional mass-spring-damper system and the second two-dimensional mass-spring-damper system, wherein the first two-dimensional mass-spring-damper system connects the current torso mass orientation to the current torso anchor orientation, wherein the second two-dimensional mass-spring-damper system connects the current object mass orientation to the current object anchor orientation, and wherein the object is a gun.

Optionally, the first plurality of parameters include at least one of a dead zone blend duration, a view speed to dead zone size, an in max view speed, an out max dead zone size, a dead zone adjust rate, a torso mass, a spring constant or a damper constant of the first two-dimensional mass-spring-damper system, wherein the second plurality of parameters include at least one of an object orientation blend duration, a view speed to object offset, an in max view speed, an out max object offset, an object mass, an object pivot point, a yaw-to-roll scale, a spring constant or a damper constant of the second two-dimensional mass-spring-damper system, and wherein the third plurality of parameters include at least one of a fire duration, a fire start blend duration, a fire finish blend duration, a fire smoothing rate, a fire torso dead zone scale or a fire torso-to-object scale.

Optionally, the first plurality of parameters include at least two of a dead zone blend duration, a view speed to dead zone size, an in max view speed, an out max dead zone size, a dead zone adjust rate, a torso mass, a spring constant or a damper constant of the first two-dimensional mass-spring-damper system, wherein the second plurality of parameters include at least two of an object orientation blend duration, a view speed to object offset, an in max view speed, an out max object offset, an object mass, an object pivot point, a yaw-to-roll scale, a spring constant or a damper constant of the second two-dimensional mass-spring-damper system, and wherein the third plurality of parameters include at least two of a fire duration, a fire start blend duration, a fire finish blend duration, a fire smoothing rate, a fire torso dead zone scale or a fire torso-to-object scale.

Optionally, the first plurality of parameters include at least three of a dead zone blend duration, a view speed to dead zone size, an in max view speed, an out max dead zone size, a dead zone adjust rate, a torso mass, a spring constant or a damper constant of the first two-dimensional mass-spring-damper system, wherein the second plurality of parameters include at least three of an object orientation blend duration, a view speed to object offset, an in max view speed, an out max object offset, an object mass, an object pivot point, a yaw-to-roll scale, a spring constant or a damper constant of the second two-dimensional mass-spring-damper system, and wherein the third plurality of parameters include at least three of a fire duration, a fire start blend duration, a fire finish blend duration, a fire smoothing rate, a fire torso dead zone scale or a fire torso-to-object scale.

Optionally, the first plurality of parameters include at least four of a dead zone blend duration, a view speed to dead zone size, an in max view speed, an out max dead zone size, a dead zone adjust rate, a torso mass, a spring constant or a damper constant of the first two-dimensional mass-spring-damper system, wherein the second plurality of parameters include at least four of an object orientation blend duration, a view speed to object offset, an in max view speed, an out max object offset, an object mass, an object pivot point, a yaw-to-roll scale, a spring constant or a damper constant of the second two-dimensional mass-spring-damper system, and wherein the third plurality of parameters include at least four of a fire duration, a fire start blend duration, a fire finish blend duration, a fire smoothing rate, a fire torso dead zone scale or a fire torso-to-object scale.

Optionally, the first plurality of parameters include at least five of a dead zone blend duration, a view speed to dead zone size, an in max view speed, an out max dead zone size, a dead zone adjust rate, a torso mass, a spring constant or a damper constant of the first two-dimensional mass-spring-damper system, wherein the second plurality of parameters include at least five of an object orientation blend duration, a view speed to object offset, an in max view speed, an out max object offset, an object mass, an object pivot point, a yaw-to-roll scale, a spring constant or a damper constant of the second two-dimensional mass-spring-damper system, and wherein the third plurality of parameters include at least five of a fire duration, a fire start blend duration, a fire finish blend duration, a fire smoothing rate, a fire torso dead zone scale or a fire torso-to-object scale.

Optionally, the first plurality of parameters include at least six of a dead zone blend duration, a view speed to dead zone size, an in max view speed, an out max dead zone size, a dead zone adjust rate, a torso mass, a spring constant or a damper constant of the first two-dimensional mass-spring-damper system, wherein the second plurality of parameters include at least six of an object orientation blend duration, a view speed to object offset, an in max view speed, an out max object offset, an object mass, an object pivot point, a yaw-to-roll scale, a spring constant or a damper constant of the second two-dimensional mass-spring-damper system, and wherein the third plurality of parameters include all of a fire duration, a fire start blend duration, a fire finish blend duration, a fire smoothing rate, a fire torso dead zone scale or a fire torso-to-obj ect scale.

Optionally, the first plurality of parameters include at least seven of a dead zone blend duration, a view speed to dead zone size, an in max view speed, an out max dead zone size, a dead zone adjust rate, a torso mass, a spring constant or a damper constant of the first two-dimensional mass-spring-damper system, wherein the second plurality of parameters include at least seven of an object orientation blend duration, a view speed to object offset, an in max view speed, an out max object offset, an object mass, an object pivot point, a yaw-to-roll scale, a spring constant or a damper constant of the second two-dimensional mass-spring-damper system, and wherein the third plurality of parameters include all of a fire duration, a fire start blend duration, a fire finish blend duration, a fire smoothing rate, a fire torso dead zone scale or a fire torso-to-obj ect scale.

Optionally, the first plurality of parameters include all of a dead zone blend duration, a view speed to dead zone size, an in max view speed, an out max dead zone size, a dead zone adjust rate, a torso mass, a spring constant or a damper constant of the first two-dimensional mass-spring-damper system, wherein the second plurality of parameters include at least eight of an object orientation blend duration, a view speed to object offset, an in max view speed, an out max object offset, an object mass, an object pivot point, a yaw-to-roll scale, a spring constant or a damper constant of the second two-dimensional mass-spring-damper system, and wherein the third plurality of parameters include all of a fire duration, a fire start blend duration, a fire finish blend duration, a fire smoothing rate, a fire torso dead zone scale or a fire torso-to-object scale.

Optionally, the first plurality of parameters include all of a dead zone blend duration, a view speed to dead zone size, an in max view speed, an out max dead zone size, a dead zone adjust rate, a torso mass, a spring constant or a damper constant of the first two-dimensional mass-spring-damper system, wherein the second plurality of parameters include all of an object orientation blend duration, a view speed to object offset, an in max view speed, an out max object offset, an object mass, an object pivot point, a yaw-to-roll scale, a spring constant or a damper constant of the second two-dimensional mass-spring-damper system, and wherein the third plurality of parameters include all of a fire duration, a fire start blend duration, a fire finish blend duration, a fire smoothing rate, a fire torso dead zone scale or a fire torso-to-object scale.

Optionally, the first plurality of parameters include at least one of, or at least two of, or at least three of, or at least four of, or at least five of, or at least six of, or at least seven of or all of a dead zone blend duration, a view speed to dead zone size, an in max view speed, an out max dead zone size, a dead zone adjust rate, a torso mass, a spring constant or a damper constant of the first two-dimensional mass-spring-damper system, wherein the second plurality of parameters include at least one of, or at least two of, or at least three of, or at least four of, or at least five of, or at least six of, or at least seven of, or at least eight of, or all of an object orientation blend duration, a view speed to object offset, an in max view speed, an out max object offset, an object mass, an object pivot point, a yaw-to-roll scale, a spring constant or a damper constant of the second two-dimensional mass-spring-damper system, and wherein the third plurality of parameters include at least one of, or at least two of, or at least three of, or at least four of, or at least five of, or all of a fire duration, a fire start blend duration, a fire finish blend duration, a fire smoothing rate, a fire torso dead zone scale or a fire torso-to-object scale.

In some embodiments, the present specification discloses a computer readable non-transitory medium comprising a plurality of executable programmatic instructions wherein, when said plurality of executable programmatic instructions are executed by a processor in a computing device, a process for determining orientation of a virtual character's first-person arms and object model is performed as the virtual character is turned by a player during gameplay, said virtual character being characterized by a torso having a mass and an anchor, said object being held by said virtual character and being characterized by a mass and an anchor, the plurality of executable programmatic instructions comprising: calculating, using a module in at least one server, a current torso anchor orientation from the virtual character's view vector orientation and view vector angular velocity; calculating, using the module in the at least one server, a current torso mass orientation based on the current torso anchor orientation; calculating, using the module in the at least one server, a current object anchor orientation from the virtual character's view vector angular velocity and the current torso mass orientation; calculating, using the module in the at least one server, a current object mass orientation based on the current object anchor orientation; calculating, using the module in the at least one server, a first angular offset between the current torso mass orientation and the view vector orientation, wherein the first angular offset is applied as a rotation to the virtual character's first-person arms and object model at the virtual character's shoulder; and calculating, using the module in the at least one server, a second angular offset between the current object mass orientation and the view vector orientation, wherein the second angular offset is applied as a rotation to the virtual character's first-person arms and object model at a point on the object.

In some embodiments, the present specification discloses a computer readable non-transitory medium comprising a plurality of executable programmatic instructions wherein, when said plurality of executable programmatic instructions are executed by a processor in a computing device, a process for determining orientation of a virtual character's first-person arms and object model is performed as the virtual character is turned by a player during gameplay, said virtual character being characterized by a torso having a mass and an anchor, said object being held by said virtual character and being characterized by a mass and an anchor, the plurality of executable programmatic instructions comprising: calculating, using a module in at least one server, a current torso anchor orientation from the virtual character's view vector orientation and view vector angular velocity; calculating, using the module in the at least one server, a current torso mass orientation based on the current torso anchor orientation; calculating, using the module in the at least one server, a current object anchor orientation from the virtual character's view vector angular velocity and the current torso mass orientation; calculating, using the module in the at least one server, a current object mass orientation based on the current object anchor orientation; calculating, using the module in the at least one server, a first angular offset between the current torso mass orientation and a screen position, wherein the first angular offset is applied as a rotation to the virtual character's first-person arms and object model at the virtual character's shoulder; and calculating, using the module in the at least one server, a second angular offset between the current object mass orientation and the screen position, wherein the second angular offset is applied as a rotation to the virtual character's first-person arms and object model at a point on the object.

Optionally, the current torso anchor orientation is aligned with the view vector orientation while the view vector angular velocity is zero.

Optionally, when the virtual character has a non-zero view vector angular velocity, a dead zone is generated around the view vector orientation, and wherein the current torso anchor orientation is dragged as the virtual character's view vector orientation turns when the current torso anchor orientation hits a wall of the dead zone.

Optionally, a size of the dead zone is a function of the view vector angular velocity.

Optionally, the current torso mass orientation is connected to the current torso anchor orientation by a first two-dimensional mass-spring-damper system, and wherein the first two-dimensional mass-spring-damper system determines a first value indicative of a pitch and a second value indicative of a yaw.

Optionally, the current object anchor orientation is determined by adding a third angular offset to the current torso mass orientation.

Optionally, the third angular offset is determined by scaling the view vector angular velocity in a corresponding axis.

Optionally, the current object anchor orientation leads the current torso mass orientation in a direction of turning of the virtual character.

Optionally, the current object mass orientation is connected to the current object anchor orientation by a second two-dimensional mass-spring-damper system, and wherein the second two-dimensional mass-spring-damper system determines a third value indicative of a pitch and a fourth value indicative of a yaw.

Optionally, the first angular offset is used to pivot the virtual character's first-person arms and object model near the virtual character's shoulder.

Optionally, the second angular offset is used to pivot the virtual character's first-person arms and object model at said point on the object.

Optionally, the module is configured to generate at least one graphical user interface that displays a first plurality of parameters directed towards customizing the virtual character's torso orientation, a second plurality of parameters directed towards customizing the object orientation and a third plurality of parameters directed towards customizing characteristics of first and second two-dimensional mass-spring-damper systems, said first two-dimensional mass-spring-damper system connecting the current torso mass orientation to the current torso anchor orientation while said second two-dimensional mass-spring-damper system connecting the current object mass orientation to the current object anchor orientation, and wherein said object is a gun.

Optionally, the first plurality of parameters include dead zone blend duration, view speed to dead zone size, in max view speed, out max dead zone size, dead zone adjust rate, torso mass, spring constants and damper constants of the first two-dimensional mass-spring-damper system, wherein the second plurality of parameters include object orientation blend duration, view speed to object offset, in max view speed, out max object offset, object mass, object pivot point, yaw-to-roll scale, spring constants and damper constants of the second two-dimensional mass-spring-damper system, and wherein the third plurality of parameters include fire duration, fire start blend duration, fire finish blend duration, fire smoothing rate, fire torso dead zone scale and fire torso-to-object scale.

In some embodiments, the present specification discloses a method of imparting a procedural animation to a virtual camera associated with a virtual character in a video game, wherein the virtual camera is configured to view gameplay from a first-person perspective and wherein the procedural animation is defined in six axes of motion of the virtual camera, the method being implemented by at least one server executing a plurality of programmatic instructions and comprising: determining at least a first parameter value, a second parameter value and a third parameter value, optionally for input to a Perlin noise function; generating a value by sampling a noise function, for a frame of gameplay, using the first parameter value, the second parameter value, the third parameter value, and data indicative of a game time; scaling the generated value against a predefined scale value for one of the six axes of motion of the virtual camera, wherein the steps of determining, generating and scaling are repeated for each of the six axes of motion of the virtual camera; and moving an orientation of the virtual camera based on the scaled generated value.

Optionally, the first parameter value corresponds to an amplitude, the second parameter value corresponds to a frequency and the third parameter corresponds to persistence.

Optionally, the first parameter value, the second parameter value and the third parameter values are each determined based on at least one of the virtual character's linear velocity, angular velocity, or one or more events in gameplay.

Optionally, the first parameter value, the second parameter value and the third parameter value each have a linear relationship with the virtual character's linear and angular velocities.

Optionally, at least one of the first parameter value, the second parameter value or the third parameter value have a non-linear relationship with the virtual character's linear and angular velocities.

Optionally, the noise function is a Perlin noise function and further comprising sampling six octaves of Perlin noise in one dimension for each of the six axes of motion of the camera.

Optionally, the method further comprises defining the procedural animation with reference to x, y, and z axes in translational motion and with reference to yaw, pitch, and roll in rotational motion.

Optionally, the generated value is applied as an offset to one of the six axes of motion of the camera.

Optionally, the module is configured to generate at least one graphical user interface that displays a first plurality of parameters directed towards customizing a rotational motion of the virtual camera, a second plurality of parameters directed towards customizing modifiers to the first parameter value, the second parameter value and the third parameter value with the virtual character's movement, and a third plurality of parameters directed towards customizing modifiers to the first parameter value, the second parameter value and the third parameter value with movement of the virtual character's view vector orientation.

Optionally, the first plurality of parameters include at least one of an amplitude, a frequency, a persistence or a view-move scale combine mode, wherein the second plurality of parameters include at least one of a modifier, a non-linear map, an in speed blend in time, an in speed blend out time, an in player move speed, an out frequency scale, an out amplitude scale, an out persistence scale, an out blend in time or an out blend out time, and wherein the third plurality of parameters include at least one of a modifier, a non-linear map, an in speed blend in time, an in speed blend out time, an in player view speed, an out frequency scale, an out amplitude scale, an out persistence scale, an out blend in time and an out blend out time.

In some embodiments, the present specification discloses a computer readable non-transitory medium comprising a plurality of executable programmatic instructions wherein, when said plurality of executable programmatic instructions are executed by a processor in a computing device, a process for imparting procedural animation to a virtual camera is performed, said virtual camera being camera associated with a player's virtual character in a video game, said virtual camera being configured to view gameplay from a first-person perspective, wherein said procedural animation is defined in six axes of motion of the virtual camera, the plurality of executable programmatic instructions comprising: programmatic instructions, stored in said computer readable non-transitory medium, for calculating, using a module in at least one server, at least first, second and third parameter values; programmatic instructions, stored in said computer readable non-transitory medium, for generating, using the module in the at least one server, a value by sampling a noise function, for a frame of gameplay, using first parameter value, the second parameter value, the third parameter value, and data indicative of a game time; programmatic instructions, stored in said computer readable non-transitory medium, for scaling, using the module in the at least one server, the generated value against a predefined scale value for one of the six axes of motion of the virtual camera, wherein said steps of calculating, generating and scaling are repeated for each of the camera axes; and programmatic instructions, stored in said computer readable non-transitory medium, for moving, using the module in the at least one server, an orientation of the virtual camera based on the scaled generated value.

Optionally, the first parameter value corresponds to amplitude, the second parameter value corresponds to frequency and the third parameter corresponds to persistence.

Optionally, the first, second and third parameter values are each determined based on the virtual character's linear velocity, angular velocity, and one or more events in gameplay.

Optionally, the first, second and third parameter values each have a linear relationship with the virtual character's linear and angular velocities.

Optionally, at least one of the first, second or third parameter values has a non-linear relationship with the virtual character's linear and angular velocities.

Optionally, said noise function is a Perlin noise function and further comprising sampling six octaves of Perlin noise for each of said six camera axes.

Optionally, said procedural animation is defined with reference to x, y, and z axes in translation motion and with reference to yaw, pitch, and roll in rotational motion.

Optionally, the generated value is applied as an offset to one of the six axes of motion of the virtual camera.

Optionally, the module is configured to generate at least one graphical user interface that displays a first plurality of parameters directed towards customizing rotational motion of the virtual camera, a second plurality of parameters directed towards customizing modifiers to the first, second and third parameter values with the virtual character's movement, and a third plurality of parameters directed towards customizing modifiers to the first, second and third parameter values with movement of the virtual character's view vector orientation.

Optionally, the first plurality of parameters include amplitude, frequency, persistence and view-move scale combine mode, wherein the second plurality of parameters include modifier, non-linear map, in speed blend in time, in speed blend out time, in player move speed, out frequency scale, out amplitude scale, out persistence scale, out blend in time and out blend out time, and wherein the third plurality of parameters include modifier, non-linear map, in speed blend in time, in speed blend out time, in player view speed, out frequency scale, out amplitude scale, out persistence scale, out blend in time and out blend out time.

The aforementioned and other embodiments of the present specification shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein:

FIG. 2B is a flowchart of a plurality of steps of a method for using a virtual character's view vector angular velocity (in degrees per second) in an axis in order to determine a dead zone size (in degrees) in that axis, in accordance with some embodiments of the present specification;

FIG. 4 shows an exemplary GUI that displays a plurality of customizable parameters associated with a virtual character's torso and handheld gun orientations, in accordance with some embodiments of the present specification;

FIG. 5 shows an exemplary GUI that displays a plurality of customizable parameters associated with procedural animation or rotational shake motion of a player's virtual camera, in accordance with some embodiments of the present specification.

DETAILED DESCRIPTION

Figure 1:
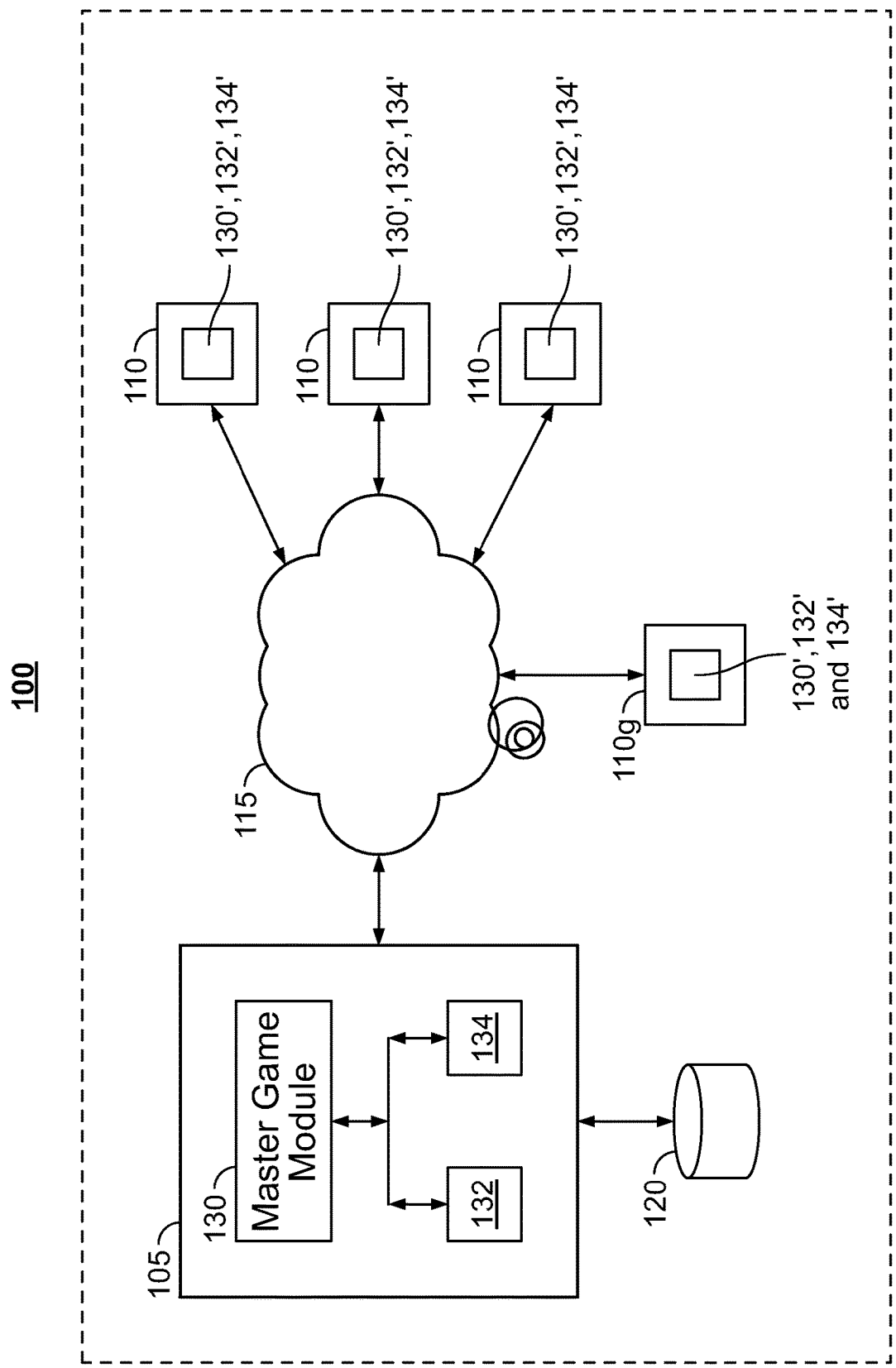
FIG. 1 is a block diagram illustration of a multi-player online gaming system or environment, in accordance with some embodiments of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The term "a multi-player online gaming environment" or "massively multiplayer online game" may be construed to mean a specific hardware architecture in which one or more servers electronically communicate with, and concurrently support game interactions with, a plurality of client devices, thereby enabling each of the client devices to simultaneously play in the same instance of the same game. Preferably the plurality of client devices number in the dozens, preferably hundreds, preferably thousands. In one embodiment, the number of concurrently supported client devices ranges from 10 to 5,000,000 and every whole number increment or range therein. Accordingly, a multi-player gaming environment or massively multi-player online game is a computer-related technology, a non-generic technological environment, and should not be abstractly considered a generic method of organizing human activity divorced from its specific technology environment.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enable or cause the CPU of the computing device to perform various functions and processes. In alternate embodiments, hard-wired circuitry may be used in place of, or in combination with, software instructions for implementation of the processes of systems and methods described in this application. Thus, the systems and methods described are not limited to any specific combination of hardware and software.

The term "module", "application" or "engine" used in this disclosure may refer to computer logic utilized to provide a desired functionality, service or operation by programming or controlling a general purpose processor. Stated differently, in some embodiments, a module, application or engine implements a plurality of instructions or programmatic code to cause a general purpose processor to perform one or more functions. In various embodiments, a module, application or engine can be implemented in hardware, firmware, software or any combination thereof. The module, application or engine may be interchangeably used with unit, logic, logical block, component, or circuit, for example. The module, application or engine may be the minimum unit, or part thereof, which performs one or more particular functions.

The term "coherent noise" used in this disclosure may refer to any type of smooth pseudorandom noise. Coherent noise is generated by a coherent-noise function, which may be defined by the following characteristics: a) passing in the same input value will always return the same output value, b) a small change in the input value will produce a small change in the output value, and c) a large change in the input value will produce a seemingly random change in the output value.

The term "Perlin Noise" used in this disclosure may refer to a type of coherent noise that is the sum of several coherent-noise functions of ever-increasing frequencies and ever-decreasing amplitudes. Each coherent-noise function that is part of a Perlin Noise function is called an octave.

The term "octave" used in this disclosure may refer to one of the coherent-noise functions in a series of coherent-noise functions that are added together to form Perlin Noise. These coherent-noise functions are called octaves because each octave has, by default, double the frequency of the previous octave. The number of octaves controls the amount of detail of Perlin Noise. Adding more octaves increases the detail of Perlin Noise, with the added drawback of increasing the calculation time.

In embodiments, three translational motion axes (translation in x, y, and z) are orthogonal to each other. In embodiments, a 3D body can be rotated about three orthogonal axes, which may be referred to as "pitch", "roll", and "yaw". It should be noted, however, that in some embodiments, when an offline transform is performed on calculations in a system defined by three orthogonal axes to semantically convert them into angles (i.e. the value in each axis in multiplied to 360 degrees to refer to them as "angles in pitch, yaw, and roll"), the values in yaw, pitch, and roll (Euler angles) may not be orthogonal to each other. Thus, in embodiments, the axes used for translation calculations are not orthogonal to the axes used for rotation calculations.

The term "amplitude" used in this disclosure may refer to a maximum absolute value that a specific coherent-noise function can output.

The term "frequency" used in this disclosure may refer to a number of cycles per unit length that a specific coherent-noise function outputs.

The term "persistence" used in this disclosure may refer to a multiplier that determines how quickly the amplitudes diminish for each successive octave in a Perlin Noise function. The amplitude of each successive octave is equal to the product of the previous octave's amplitude and the persistence value. Increasing the persistence produces "rougher" Perlin Noise.

The term "first-person" used in this disclosure may refer to a visual perspective that is presented to a human player of a video game. In the first-person, the visual perspective is designed to make the human player feel as if his or her own eyes are viewing the presented scene Therefore, in a "first-person" video game, the graphical perspective is rendered from the viewpoint of the human player's virtual character, or a viewpoint from a camera mounted on the body of the human player's virtual character, which typically means the graphical perspective visually presents any portion of the virtual character, such as the limbs or objects (such as, for example, weapons) being held by the virtual character, that would naturally enter into the virtual character's field of view.

In a video game with a first-person perspective, a player uses inputs such as gamepads, joysticks, mice, trackpads, etc., to navigate and look around a game world. In some cases, a targeting crosshair, placed in the center of the player's viewpoint, may be used to represent the player's focus or, in cases where the player may be holding a virtual weapon, where ammunition would impact if fired from the virtual character's weapon. In this context, the term "dead zone" used in this disclosure may indicate how responsive the human player's controls are when moving the virtual character's viewpoint and, with it, the crosshairs. With a small dead zone, the "Torso Anchor" will move immediately when the human player manipulates his controls. A larger dead zone requires the player to move the controls farther from its point of rest in order to move the crosshairs on a display screen.

The term "game time" used in this disclosure may refer to a timer that starts when a match begins and advances at a constant rate for all players. The game time is deterministic across the one or more game servers and all clients. The system references important events in terms of their game time (for example, "40 damage was applied to player 3 at game time 135468"). Thus, game time is a constantly advancing timer in milliseconds indicating how much time has elapsed since the match began. In one embodiment, game time is specific to an instance of a game and only common to all players of that specific game instance. In another embodiment, game time universal across all instances of games being played such that, regardless of when a specific game instance was initiated, it would reference the same clock as another game instance which may have begun earlier or later in time.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

Overview

FIG. 1 illustrates an embodiment of a multi-player online gaming or massively multiplayer online gaming system/environment 100 in which the systems and methods of the present specification may be implemented or executed. The system 100 comprises client-server architecture, where one or more game servers 105 are in communication with one or more client devices 110 over a network 115. Players and non-players, such as computer graphics artists or designers, may access the system 100 via the one or more client devices 110. The client devices 110 comprise computing devices such as, but not limited to, personal or desktop computers, laptops, Netbooks, handheld devices such as smartphones, tablets, and PDAs, gaming consoles and/or any other computing platform known to persons of ordinary skill in the art. Although three client devices 110 are illustrated in FIG. 1, any number of client devices 110 can be in communication with the one or more game servers 105 over the network 115.

The one or more game servers 105 can be any computing device having one or more processors and one or more computer-readable storage media such as RAM, hard disk or any other optical or magnetic media. The one or more game servers 105 include a plurality of modules operating to provide or implement a plurality of functional, operational or service-oriented methods of the present specification. In some embodiments, the one or more game servers 105 include or are in communication with at least one database system 120. The database system 120 stores a plurality of game data associated with at least one game that is served or provided to the client devices 110 over the network 115. In some embodiments, the one or more game servers 105 may be implemented by a cloud of computing platforms operating together as game servers 105.

In accordance with aspects of the present specification, the one or more game servers 105 provide or implement a plurality of modules or engines such as, but not limited to, a master game module 130, an object and arms movement (OAM) module 132, and a virtual camera movement (VCaM) module 134. In some embodiments, the one or more client devices 110 are configured to implement or execute one or more of a plurality of client-side modules some of which are same as or similar to the modules of the one or more game servers 105. For example, in some embodiments each of the player and non-player client devices 110 executes a client-side game module 130' (also referred to as—client game module 130') that integrates a client-side object and arms movement module 132' and a client-side virtual camera movement module 134'.

In some embodiments, the at least one non-player client device 110g is used by the computer graphics artist or designer to log into the one or more game servers 105 (via the client game module 130') and execute the modules 132 and 134 on the server to customize, adjust or modulate a first plurality of parameters associated with a virtual character's torso and handheld object orientations and a second plurality of parameters associated with procedural animation or rotational shake motion of a virtual character's/player's virtual camera, offline. The tuned first and second plurality of parameters are stored in the at least one database 120.

While various aspects of the present specification are being described with reference to functionalities or programming distributed across multiple modules or engines 132 and 134, it should be appreciated that, in some embodiments, some or all of the functionalities or programming associated with these modules or engines may be integrated within fewer modules or in a single module—such as, for example, in the master game module 130 itself on the server side and in the client gaming module 130' on the client side.

In embodiments, the master game module 130 is configured to execute an instance of an online game to facilitate interaction of the players with the game. In embodiments, the instance of the game executed may be synchronous, asynchronous, and/or semi-synchronous. The master game module 130 controls aspects of the game for all players and receives and processes each player's input in the game. In other words, the master game module 130 hosts the online game for all players, receives game data from the client devices 110 and transmits updates to all client devices 110 based on the received game data so that the game, on each of the client devices 110, represents the most updated or current status with reference to interactions of all players with the game. Thus, the master game module 130 transmits game data over the network 115 to the client devices 110 for use and rendering by the game module 130' to provide local versions and current status of the game to the players.

On the client-side, each of the one or more player client devices 110 implements the game module 130' that operates as a gaming application to provide a player with an interface between the player and the game. The game module 130' generates the interface to render a virtual environment, virtual space or virtual world associated with the game and enables the player to interact in the virtual environment to perform a plurality of game and other tasks and objectives. The game module 130' accesses game data received from the game server 105 to provide an accurate representation of the game to the player. The game module 130' captures and processes player inputs and interactions within the virtual world or environment and provides updates to the game server 110 over the network 115.

The database system 120 described herein may be, include, or interface to, for example, an Oracle™ relational database sold commercially by Oracle Corporation. Other databases, such as Informixv, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database system 120 may comprise one or more such databases that reside in one or more physical devices and in one or more physical locations.

Object and Arms Movement (OAM) Module

In various embodiments, the OAM module or engine 132 implements a plurality of instructions or programmatic code to enable a virtual character's movement of his arms and hand-held object to be perceived, from a first-person perspective, as sufficiently chaotic or random, thereby imparting dynamic, non-linear and realistic look and feel to the movement of the virtual character and hand-held object. To impart the realistic, chaotic or random motion the module 132 defines and implements a double two-dimensional (2D) mass-spring-damper system. In some embodiments, the double 2D mass-spring-damper system comprises a first mass-spring-damper unit or sub-system defined to model movement of the virtual character's arms and a second mass-spring-damper unit or sub-system defined to model movement of the virtual character's hand-held object.

In some embodiments, each of the first and second mass-spring-damper units or sub-systems is associated with, linked, anchored or coupled to the virtual character's view vector in a way that generates a perception that the first mass-spring-damper unit or sub-system is linked to the virtual character's torso or shoulder and the second mass-spring-damper unit or sub-system is linked to a tip of the hand-held object such as, but not limited to, a weapon or gun.

It should be appreciated that the nature of the double 2D mass-spring-damper system ensures that, when applied, movement of the virtual character's arms and object do not feel too linear. Similarly, the chaotic movement generated by the first and second spring systems is bounded by the use of dampers in these spring systems. The faster the mass elements of the first and second spring systems are moving, the more friction they introduce.

In embodiments, the two sets of 2D mass-spring-damper system are modeled with an applied force (that is, the force being generated from movement of a virtual character) being directed to a tip of an object, such as a weapon or gun, (so that it leads the object) as opposed to what happens in reality where the force is applied to a handle of the gun. It should be appreciated that all of the steps, algorithms, or other processes described herein are implemented in the form of programmatic instructions, stored in a non-transient memory, and executed by at least one processor in the video game client or hosting server.

A 2D Mass-Spring-Damper Unit or Sub-System

A damped harmonic oscillator, or a mass-spring-damper system, is a system where a motion between an anchor point and a moving mass is controlled by a spring and a damper variable. The force on the spring increases as the anchor and mass move farther apart. The damper variable generates a frictional force that opposes any motion of the mass, and its frictional force increases as the relative velocity between the anchor and mass increases. In embodiments of the present specification, the anchor is not fixed in space. The anchor is moved by game logic and the mass essentially follows it around via the forces of the mass-spring-damper system, as described herein. Accordingly, the programmatic instructions taught herein, when executed, determine a first location of an anchor point based on one or more parameters of the game or data generated in the course of the game, apply the mass-spring-damper logic described herein, and determine a position and orientation of the mass based upon the applied mass-spring-damper logic.

To integrate a motion of a mass-spring-damper unit over time in one dimension, an equation for a damped harmonic oscillator is used which is implemented based on data generated for a frame of the video game that is currently being rendered and used to generate a relative velocity and a relative displacement for a mass and an anchor in a subsequent frame of the video game. More specifically, the client device or server determines, for a first frame of a predefined duration, an offset or displacement between a mass and an anchor and a relative velocity between the mass and the anchor. The client device or server then determines, for a subsequent frame of a predefined duration, an offset or displacement between the mass and the anchor and the relative velocity between the mass and the anchor, assuming that the time duration of the subsequently rendered frame is equal to that of the first frame. This process serves to advance the calculation of a mass-spring-damper system along a straight line forward in time using the Forward Euler Method of numerical integration.

$$a = -k*x0 - c*v0$$

$$v1 = a*t + v0$$

$$x1 = v1*t + x0$$

where:
'a' is the relative acceleration between the mass and anchor,
k is a spring coefficient or constant,
c is a damper coefficient or constant,
'x0' is the current offset between the mass and anchor,
'v0' is the current relative velocity between the mass and anchor,
't' is the time step between the current frame and next frame,
'v1' is the next frame's relative velocity between the mass and anchor, and
'x1' is the next frame's offset between the mass and anchor.

However, the aforementioned calculations v1 and x1 are unstable at variable frame rates—that is, the resulting relative velocity and offsets calculated using the mass-spring-damper system would appear to unexpectedly jitter if subsequent rendered frames had slightly different durations.

In accordance with some embodiments, the client device or server implement a Backward Euler Method of numerical integration to calculate the relative velocity (v1) and relative offset (x1) for a more stable result in case of variable frame rates. The Backward Euler Method initiates with an assumption that the next rendered frame's acceleration between mass and anchor (in contrast to the current relative acceleration) is already known, and then the equations are solved considering the information available from the current rendered frame.

For example, the equations to integrate a damped harmonic oscillator in one dimension or axis become:
a1 = −k*x1 − c*v1 (Backward Euler, note that x1 and v1 are unknowns)

Attempting to get v1 in terms of values we have in the current time (x0, v0, and t):

$$v1 = a1*t + v0$$

Substitute for a1 from above:

$$v1 = (-k*x1 - c*v1)*t + v0$$

Substitute for x1, then simplify:

$$v1 = (v0 - k*t*x0 + c)/(1 + k*t^2 + c*t)$$

$$x1 = v1*t + x0$$

where, a1 is the next rendered frame's acceleration between mass and anchor

In the client or server, programmatically determining x1 and v1 using the Backward Euler Method defines a mass-spring-damper system that is much more tolerant of irregular values for 't' over time (that is, for variable or uneven frame rates), and the result is a well-behaved damped spring system. While the aforementioned equations and calculations, based on the Backward Euler Method, are for a one dimensional (1D) mass-spring-damper system, for higher dimensions the calculations are performed independently for each axis. Stated differently, the 2D mass-spring-damper unit or system of the present specification is a 1D mass-spring-damper system in the X axis, and another instance of the same 1D system in the Y axis.

It should be noted that the module 132 implements the first and second 2D mass-spring-damper units or sub-systems to operate in Euler angles, namely, the X-axis represents pitch, and the Y-axis represents yaw. Therefore, offsets or displacements (being angular in nature) in the equations are in radians, and velocities are actually angular velocities in radians per second. Consequently, the calculated angular displacements in the first and second spring systems at a given time are applied to the virtual character's limbs and objects to establish more realistic first-person movements.

Figure 2A:
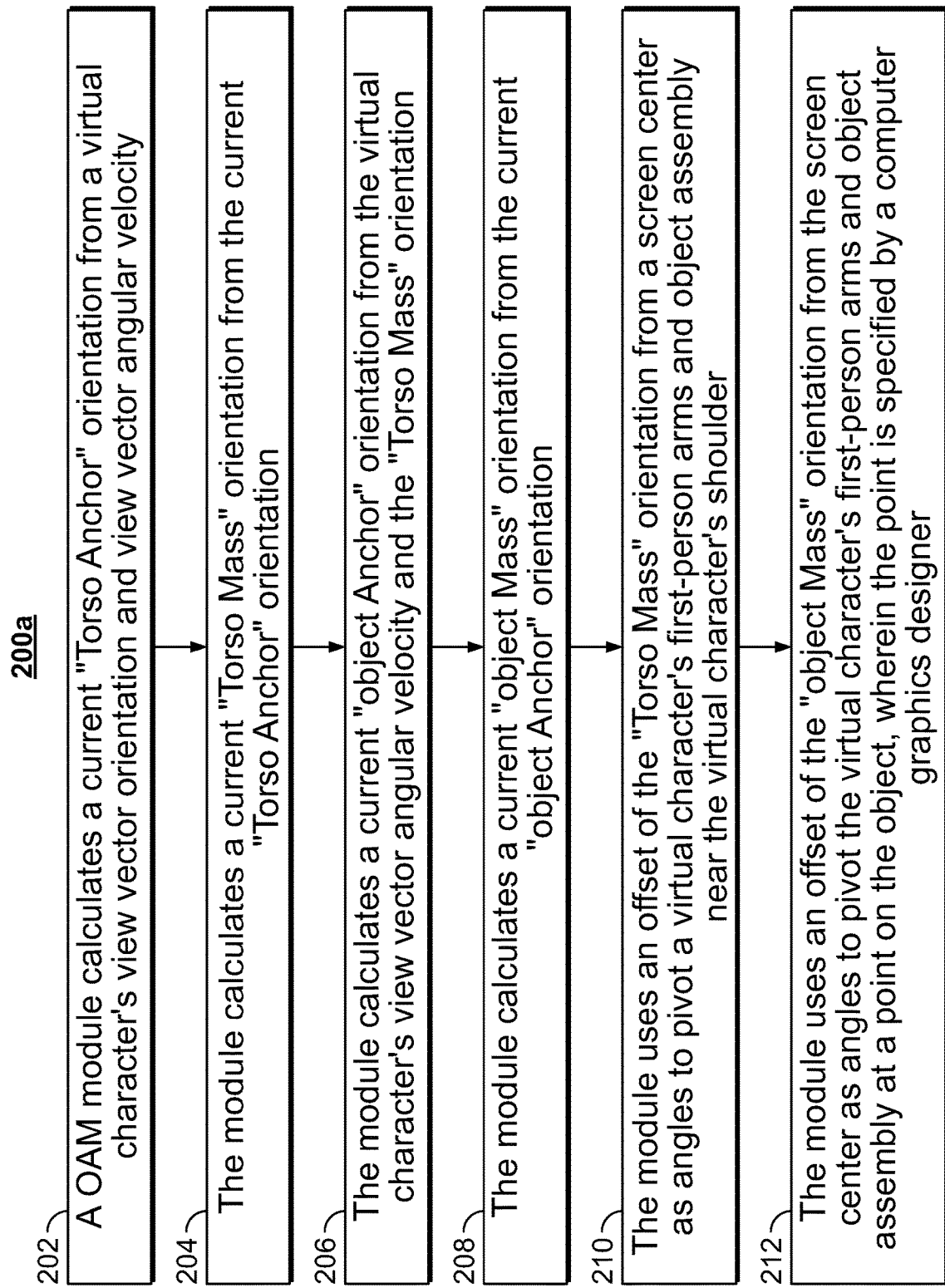
FIG. 2A is a flowchart of a plurality of exemplary steps of a method of dynamically determining an orientation or position of a virtual character's first-person limbs, particularly arms, and object as the virtual character is turned by a player during gameplay, in accordance with some embodiments of the present specification.

Determining Orientation of a Virtual Character's Limbs and Object During Gameplay FIG. 2A is a flowchart of a plurality of exemplary steps of a method 200a of dynamically determining orientation or position of a virtual character's limbs, particularly arms, and object as the virtual character is turned by a player during gameplay, in accordance with some embodiments of the present specification. In embodiments, the human player's virtual character is characterized by a torso having a mass and an anchor. In embodiments, the player's virtual character is holding an object that is characterized by a mass and an anchor. In some embodiments, the method 200 is implemented by the OAM module 132, in one or more game servers 105, in data communication with a client game module 130' on the player's client device 110 of FIG. 1. As discussed earlier in this specification, each of the first and second mass-spring-damper units or sub-systems is associated with, linked, anchored or coupled to the virtual character's view vector or viewpoint.

Figure 3A:
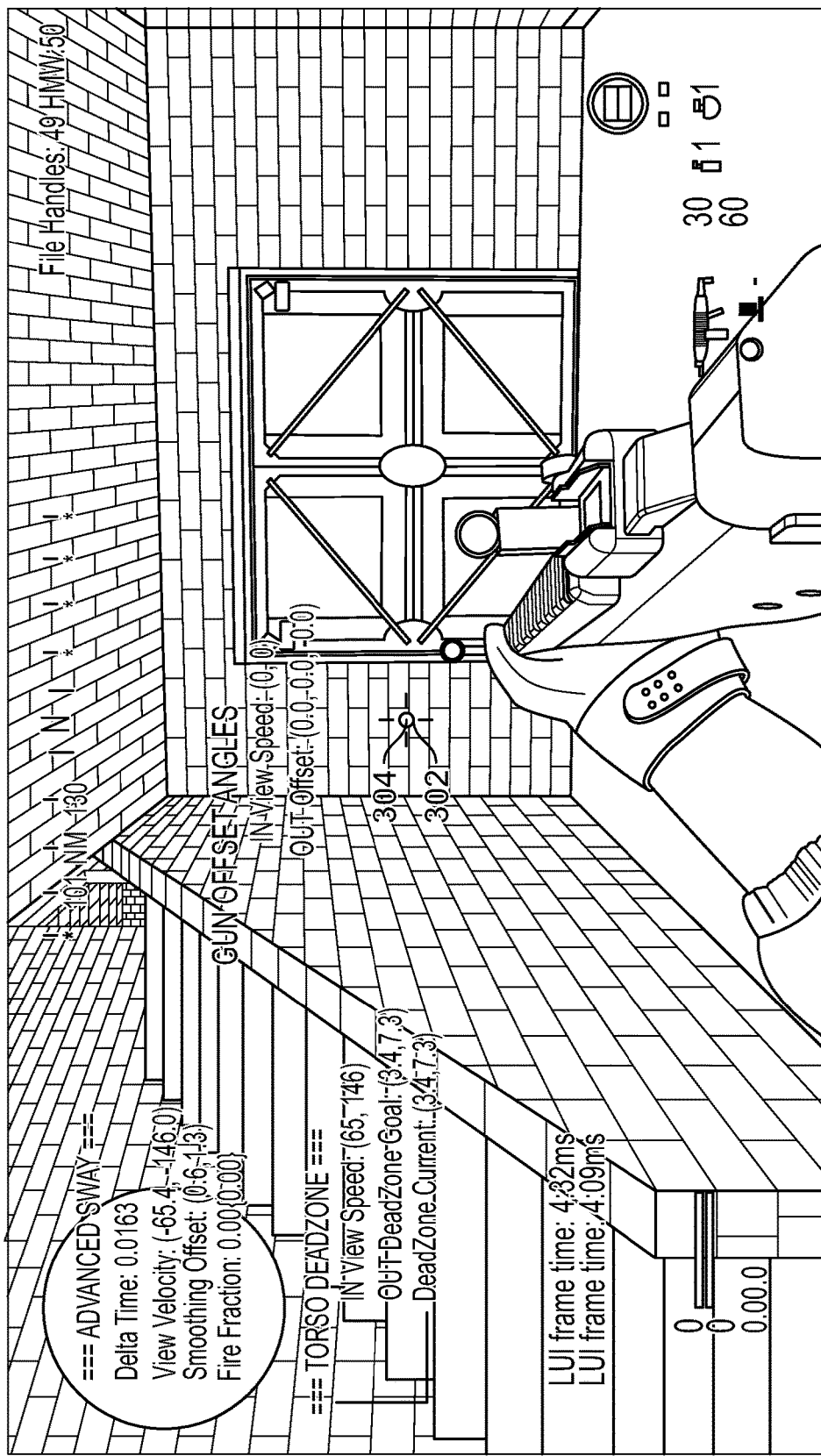
FIG. 3A shows a first screenshot illustrating a "Torso Anchor" orientation with reference to a player's view vector, in accordance with some embodiments of the present specification.

At step 202, the module 132 calculates a current "Torso Anchor" orientation from the virtual character's view vector orientation and view vector angular velocity. As shown in FIG. 3A, while the virtual character's angular view velocity is zero, the "Torso Anchor" orientation 302 (represented by a first sphere 302 in the figure) is aligned with the player's view vector or viewpoint 304 (represented by a white sphere 304 placed in the center of a targeting crosshair)—that is, the "Torso Anchor" orientation 302 is centered in the middle of the screen 300a.

Figure 3B:
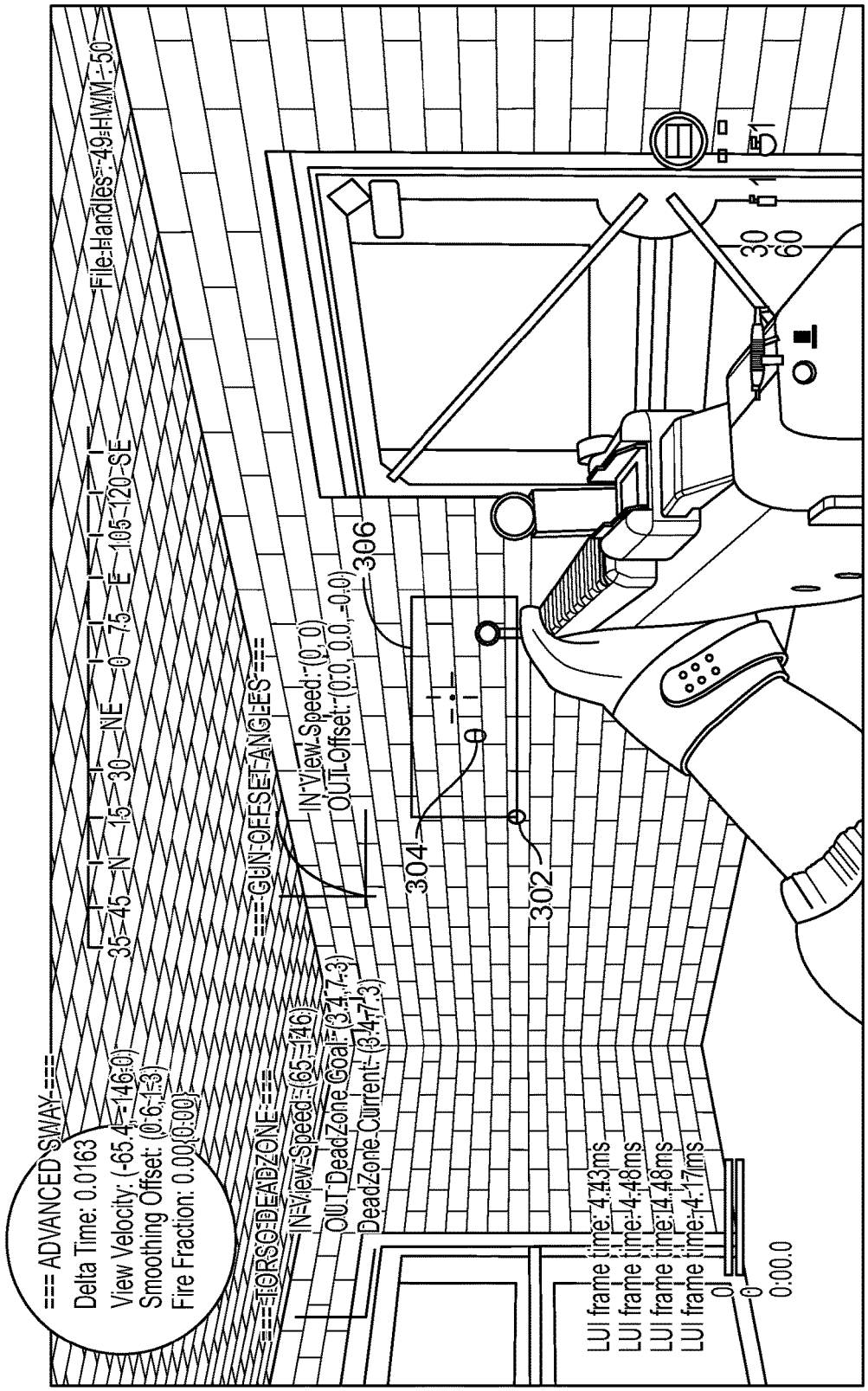
FIG. 3B shows a second screenshot illustrating a dead zone along with the "Torso Anchor" with reference to the player's view vector, in accordance with some embodiments of the present specification.

Referring now to FIG. 3B, when the virtual character has a non-zero view vector angular velocity (that is, the player is turning or moving his virtual character), a dead zone 306 (represented by a rectangle in the figure) of a size or area is considered or generated around the virtual character's moving or turning view vector 304 orientation, as shown in screen 300b. In some embodiments, the size or area of the dead zone 306 is a function of the virtual character's view angular velocity. In some embodiments, the "Torso Anchor" orientation 302 is dragged, moved or turned along with the virtual character's moving or turning view vector 304 only when the "Torso Anchor" orientation 302 hits a wall of the dead zone 306. Therefore, the faster the virtual character turns, the farther the "Torso Anchor" orientation 302 falls behind or lags the virtual character's view vector 304.

In some embodiments, a plurality of steps is implemented in order to determine a dead zone size in an axis. FIG. 2B is a flowchart of a plurality of steps of a method 200b of using the virtual character's view vector angular velocity (in degrees per second) in an axis in order to determine a dead zone size (in degrees) in that axis. In embodiments, the method 200b is implemented by the module 132.

Referring now to FIG. 2B, at step 203a, the virtual character's current view vector angular velocity is smoothed in each axis using a function, such as a first-order infinite impulse response filter that applies weighting factors which decrease exponentially, referred to as an Exponential Moving Average function. The weighting for each older datum decreases exponentially, never reaching zero, thereby weighting new data more than older data. Data corresponding to a 'dead zone blend duration' parameter 406 (FIG. 4), customized by a graphics designer, determines an amount of time over which the smoothing is performed. The smoothing process generates a "smoothed view velocity" that is less dependent on the instantaneous motions of the virtual character, but instead more generally represents the recent motion of the virtual character.

At step 203b, data corresponding to the parameters of 'in max view speed' 410, 'out max dead zone size' 412 and 'view speed to dead zone size' 408 (FIG. 4) are used to perform a nonlinear mapping from the "smoothed view velocity" to a "goal dead zone size". The 'view speed to dead zone size' 408 sub-asset can be modeled as a two dimensional (2D) graph in both the X and Y axes, with a point at (0, 0), a point at (1, 1), and designer-placed points in-between. Effectively, this allows relatively low view vector speeds to have a large impact on dead zone size and higher view vector speeds having a diminishingly smaller impact on dead zone size.

At step 203c, after calculating the "goal dead zone size", smoothing is performed from the "current dead zone size" toward the "goal dead zone size". This prevents the dead zone from changing too rapidly from quick virtual character movements. Smoothing (from the "current dead zone size" toward the "goal dead zone size") is defined by the 'dead zone adjust rate' 414 of FIG. 4. In some embodiments, the smoothing corresponds to a linear tracking algorithm where the speed of dead zone change is expressed in dead zone size in degrees/second.

At step 203d, the game is rendered in accordance with the determined "goal dead zone size".

Since the dead zone size is controlled by the virtual character's angular view velocity, this also prevents the "Torso Anchor" from snapping back to center if the player were to rapidly move his mouse back and forth. It should be appreciated that the "Torso Anchor" is driven from the player's (or virtual character's) motion and the dead zone.

Figure 3C:
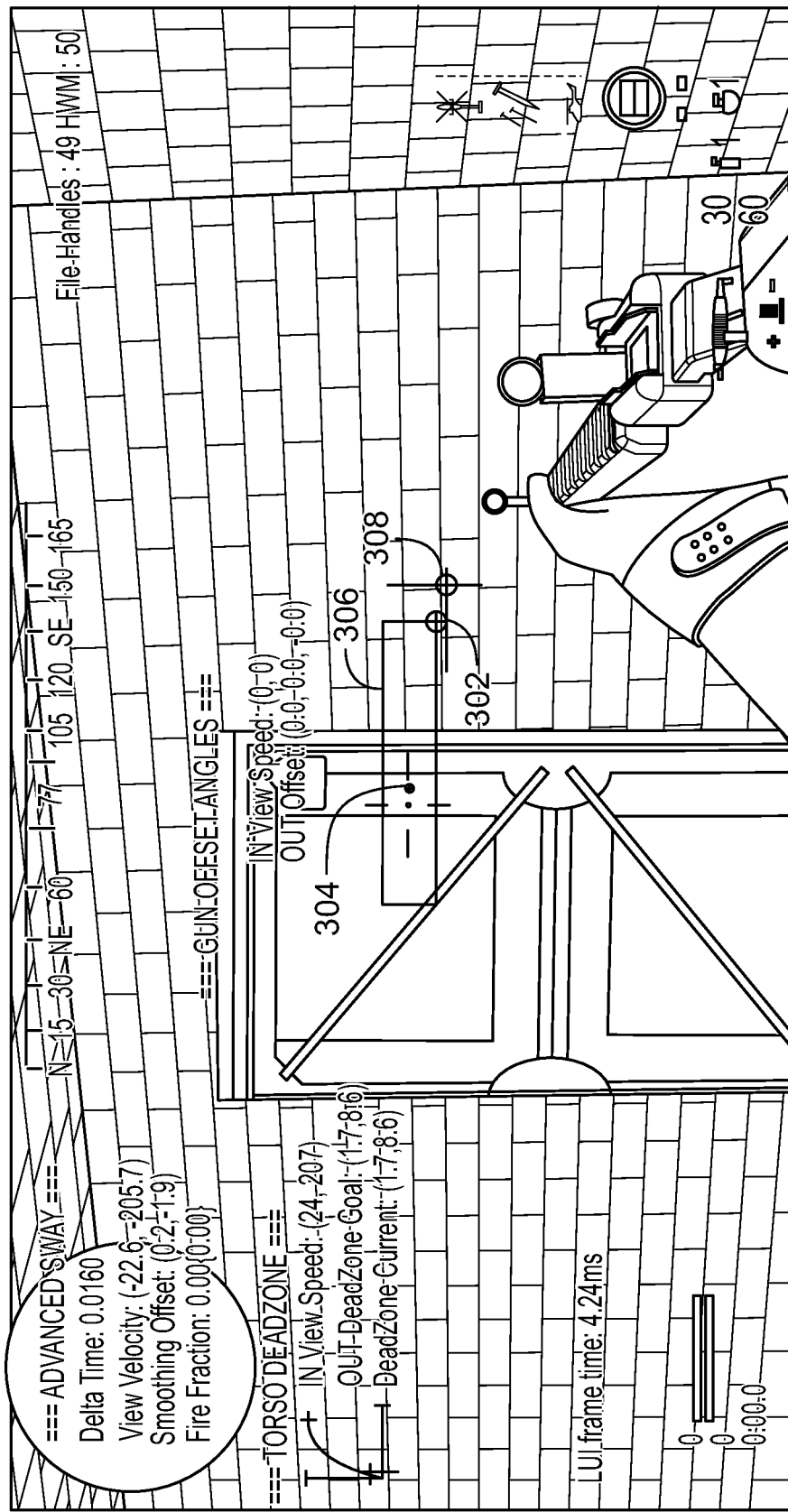
FIG. 3C shows a third screenshot illustrating a "Torso Mass" orientation along with the dead zone and the "Torso Anchor" with reference to the player's view vector, in accordance with some embodiments of the present specification.

Referring back to FIG. 2A, at step 204, the module 132 calculates a current "Torso Mass" orientation from the current "Torso Anchor" orientation determined earlier at step 202. In embodiments, a first 2D mass-spring-damper system, representing pitch and yaw in Euler angles, is used to connect the current "Torso Mass" orientation to the current "Torso Anchor" orientation. The "Torso Mass" follows the "Torso Anchor" due to the physics of the first 2D mass-spring-damper system. FIG. 3C shows the "Torso Mass" orientation 308 (represented by a second sphere 308 in the figure) with reference to the dead zone 306, the "Torso Anchor" orientation 302 and the virtual character's view vector 304 in screen 300c.

Figure 3D:
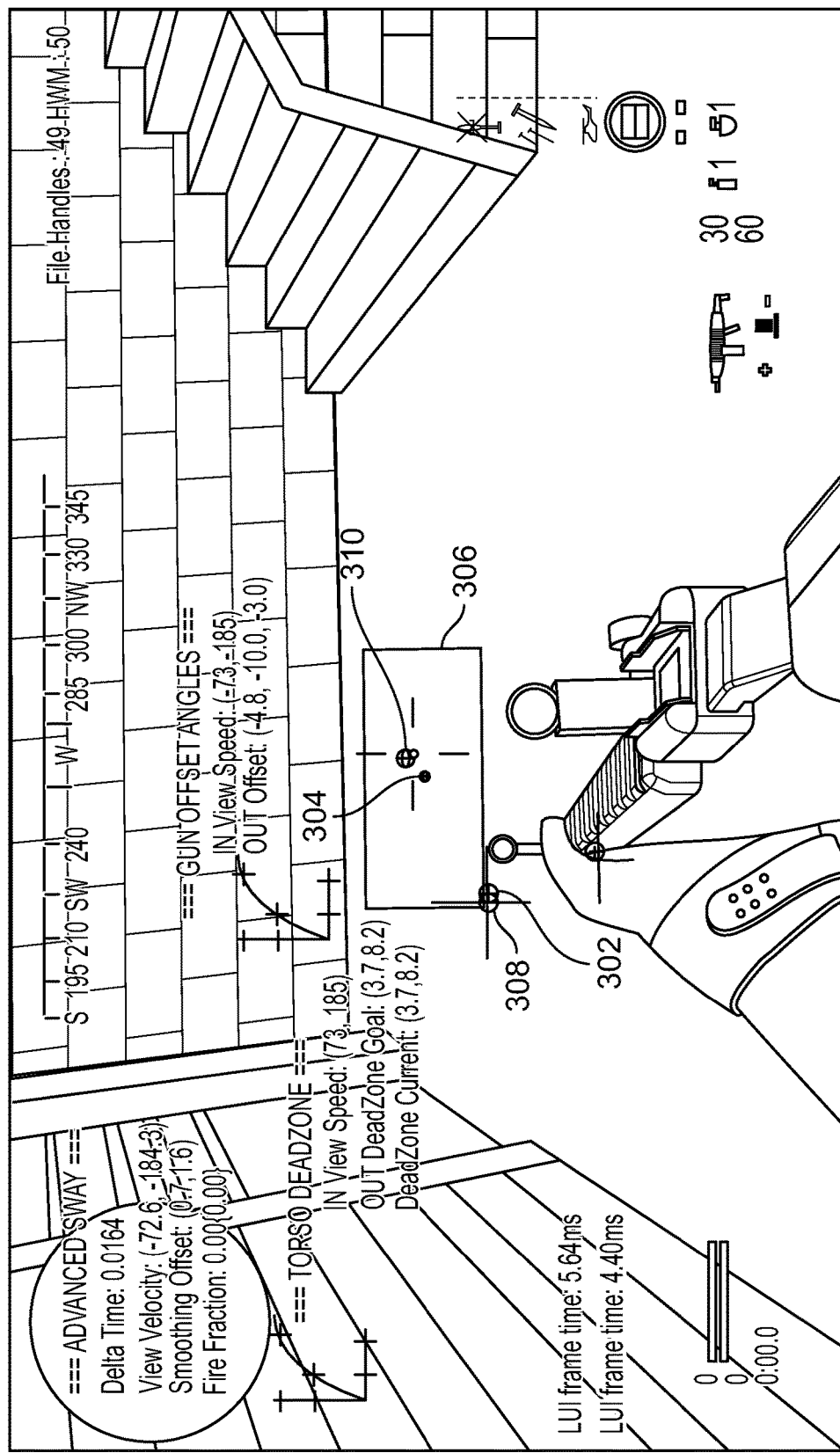
FIG. 3D shows a fourth screenshot illustrating a "Object Anchor" orientation along with the "Torso Mass" orientation, the dead zone and the "Torso Anchor" with reference to the player's view vector, in accordance with some embodiments of the present specification.

At step 206, the module 132 calculates a current "Object Anchor" orientation from the virtual character's view vector angular velocity and the "Torso Mass" orientation determined earlier at step 204. In some embodiments, the module 132 is configured to calculate the current "Object Anchor" orientation by adding a first angular offset or displacement to the current "Torso Mass" orientation. In some embodiments, the first angular offset or displacement is calculated by scaling the virtual character's view vector angular velocity in a corresponding axis. This results in defining the current "Object Anchor" orientation or position that leads ahead of the current "Torso Mass" orientation or position in a direction the virtual character is turning. FIG. 3D shows the current "Object Anchor" orientation 310 (represented by a third sphere 310 in the figure) with reference to the "Torso Mass" orientation 308 (represented by a second sphere 308 in the figure), the dead zone 306, the "Torso Anchor" orientation 302 and the virtual character's view vector 304 in screen 300d.

Figure 3E:
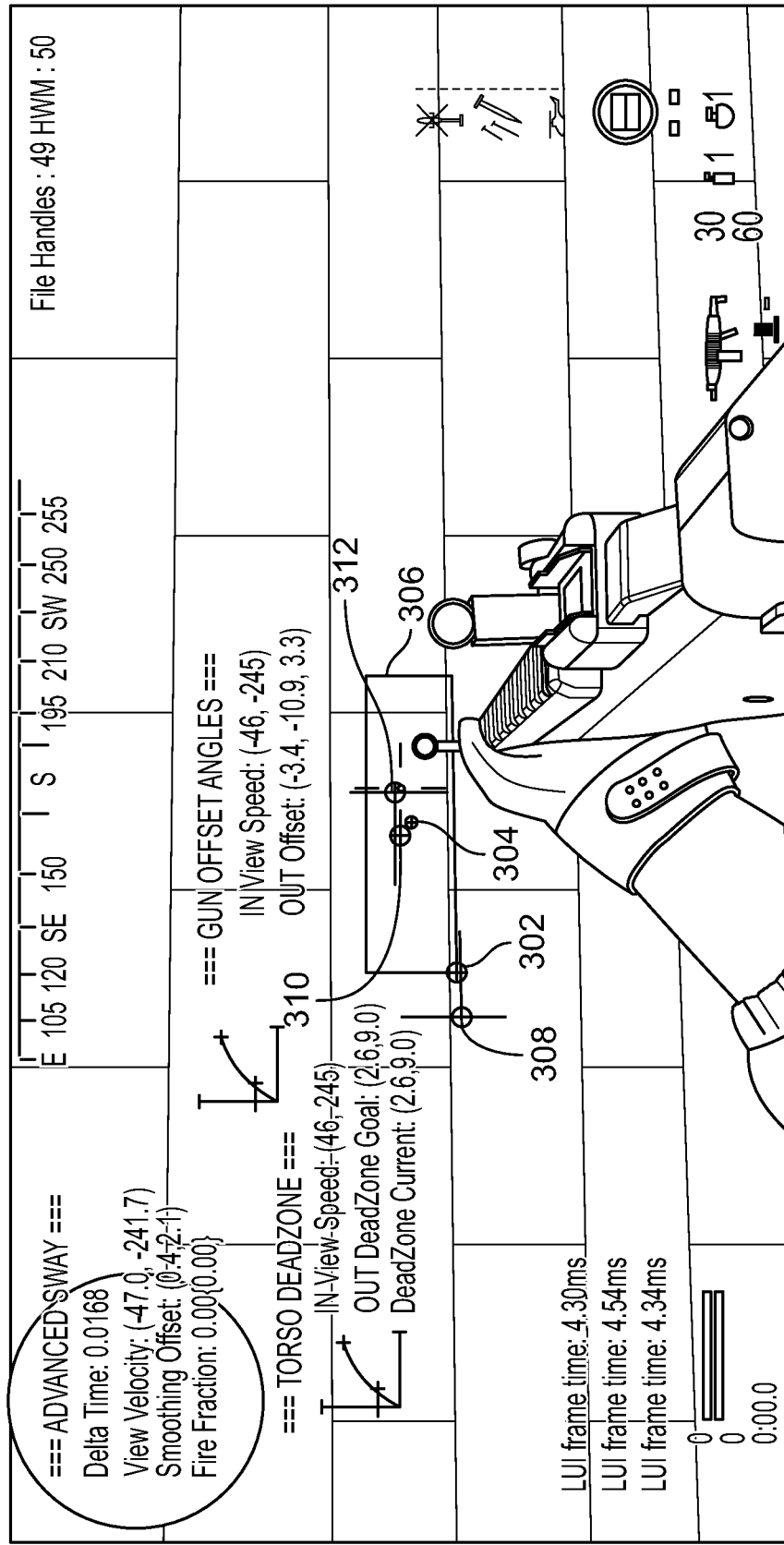
FIG. 3E shows a fifth screenshot illustrating a "Object Mass" orientation along with the "Object Anchor" orientation, the "Torso Mass" orientation, the dead zone and the "Torso Anchor" with reference to the player's view vector, in accordance with some embodiments of the present specification.

At step 208, the module 132 calculates a current "Object Mass" orientation from the current "Object Anchor" orientation determined earlier at step 206. In embodiments, a second 2D mass-spring-damper system, representing pitch and yaw in Euler angles, is used to connect the current "Object Mass" orientation to the current "Object Anchor" orientation. FIG. 3E shows the current "Object Mass" orientation 312 (represented by a fourth sphere 312 in the figure) with reference to the "Object Anchor" orientation 310, the "Torso Mass" orientation 308, the dead zone 306, the "Torso Anchor" orientation 302 and the virtual character's view vector 304 in screen 300e.

At step 210, the module 132 uses an offset of the "Torso Mass" orientation from the view vector orientation as angles to pivot the virtual character's arms and object assembly near the virtual character's shoulder. In other words, the module 132 calculates a second angular offset between the "Torso Mass" orientation and the view vector orientation. The calculated second angular offset is applied, by the module 132, as a rotation to the virtual character's arms and object model at the virtual character's shoulder.

Finally, at step 212, the module 132 uses an offset of the "Object Mass" orientation from the view vector orientation as angles to pivot the virtual character's arms and object assembly at a point on the object, wherein the point is specified by a computer graphics designer. In other words, the module 132 calculates a third angular offset between the "Object Mass" orientation and the view vector orientation. The calculated third angular offset is applied, by the module 132, as a rotation to the virtual character's arms and object model at a designer-specified pivot point on the object. A computer graphics designer or artist may specify a pivot point on the object by configuring a value of parameter 436 in FIG. 4.

In some embodiments, the virtual character's object is one that might be capable of being aimed (for example, a gun, arrow, javelin, spear, telescope, etc.). It should be appreciated that such an object's line of sight orientation is substantially a function of an angular offset of the object mass as well as an angular offset of the torso mass. In some embodiments, when the player (or the virtual character) takes aim down the object's line of sight, the module 132 temporarily blends out all procedural movement in a gameplay scene, to ensure that the object is aligned with the virtual character's view vector.

In accordance with some aspects of the present specification, the module 132 is configured to generate at least one GUI (Graphical User Interface) to enable a graphics artist or designer to customize one or more parameters, properties or characteristics associated with a virtual character's torso and object (gun, in a non-limiting example) orientations. The at least one GUI is generated in response to the graphics designer's request through a client game module 130' on his client device 110g (FIG. 1).

FIG. 4 shows an exemplary GUI 400 that displays a plurality of customizable parameters associated with a virtual character's torso and handheld gun orientations, in accordance with some embodiments of the present specification. The GUI 400 displays a checkbox 402 which when checked by a graphics designer enables the module 132 to implement the sway motion method 200 of FIG. 2 for a virtual character's first-person arms and object model during gameplay.

A first portion 400a displays a first plurality of parameters related to a virtual character's torso orientation or position. In some embodiments, the first plurality of parameters comprises:

Dead zone blend duration 406: this parameter determines an amount of time over which a virtual character's current view velocity is smoothed in each axis. Higher values of the parameter 406 result in slower dead zone shape change, making the virtual character's arms and object model (or view model) less sensitive to sudden motions and vice versa. In some embodiments, this smoothing is applied before performing a non-linear mapping from a "smoothed view velocity" to a "goal dead zone size".

View speed to dead zone size 408: this parameter is utilized in creating a nonlinear mapping between view vector speeds and dead zone size.

In max view speed 410: this parameter is utilized in creating a nonlinear mapping between view vector speeds and dead zone size.

Out max dead zone size 412: this parameter is utilized in creating a nonlinear mapping between view vector speeds and dead zone size.

Dead zone adjust rate 414: this parameter drives a simple smoothing algorithm applied to the dead zone size after nonlinear mapping. The "current dead zone size" in each axis will blend towards a resulting "goal dead zone size" in each axis at a rate specified by the parameter 414. Higher values of the parameter 414 result in snappier dead zone response to virtual character movements.

Torso mass 416: this parameter determines a mass or inertia of a "Torso Mass" itself. Higher values of the parameter 416 slow down an entire mass-spring-damper system by adding inertia without affecting the characteristic behavior of a specific set of tuning values. That is, if a designer creates a certain 'look' or 'behavior' which is just moving too fast or slow, the designer can adjust this 'mass' value 416 to make it behave the same but just slower or faster.

Spring constants 418: this parameter determines a spring constant 'k' of the first two-dimensional mass-spring-damper system. The spring constant is representative of how stiff the spring is. Stiffer (more difficult to stretch) springs have higher spring constants.

Damper constants 420: this parameter determines a damper constant 'c' of the first two-dimensional mass-spring-damper system. The damper constant is representative of a frictional force that opposes any motion of the torso mass. Higher damper constants result in high frictional forces.

Each of the parameters 410, 412, 414, 416, 418 and 420 is configured to have first and second values corresponding to pitch and yaw rotational motions.

A second portion 400b displays a second plurality of parameters related to a gun orientation or position, the gun being handheld by the virtual character. In some embodiments, the second plurality of parameters comprises:

Gun orientation blend duration 422: this parameter determines a smoothing value for a virtual character's view velocity in each axis before performing nonlinear mapping.

View speed to gun offset 424: this parameter is utilized in creating a nonlinear mapping between view vector speeds and dead zone size. Higher values of this parameter result in slower dead zone shape change, making the virtual character's arms and gun (object) model (or view model) less sensitive to sudden motions.

In max view speed 426: this parameter is utilized in creating a nonlinear mapping between view vector speeds and dead zone size.

Out max gun offset 428: this parameter is utilized in creating a nonlinear mapping between view vector speeds and dead zone size.

Gun mass 430: this parameter determines a mass or inertia of a "Gun Mass" itself. Higher values of the parameter 430 slow down an entire mass-spring-damper system by adding inertia without affecting the characteristic behavior of a specific set of tuning values. That is, if a designer creates a certain 'look' or 'behavior' which is just moving too fast or slow, the designer can adjust this 'mass' value 430 to make it behave the same but just slower or faster.

Spring constants 432: this parameter determines a spring constant 'k' of the second two-dimensional mass-spring-damper system. The spring constant is representative of how stiff the spring is. Stiffer (more difficult to stretch) springs have higher spring constants.

Damper constants 434: this parameter determines a damper constant 'c' of the second two-dimensional mass-spring-damper system. The damper constant is representative of a frictional force that opposes any motion of the torso mass. Higher damper constants result in high frictional forces.

Gun pivot point 436: this parameter specifies a pivot point on the gun around which the resulting "Gun Mass" rotation will be applied. In embodiments, rotation from "Torso Mass" is applied at the shoulder while rotation from "Gun Mass" is applied at the pivot point 436 on the virtual character's arms and object model (or view model).

Yaw-to-roll scale 438: this parameter introduces a small amount of roll (rotation in the z axis) on the virtual character's arms and object model at a specified pivot point. The parameter 438 is a scale that is multiplied against a current frame's "Gun Mass" rotation y component (yaw) to calculate a "Gun Mass" rotation z component (roll). This effectively makes the gun roll/rotate into sharp turns. Higher values make the gun roll more as it is turning.

Each of the parameters 426, 428, 430, 432 and 434 is configured to have first and second values corresponding to pitch and yaw rotational motions.

A third portion 400c displays a third plurality of parameters related to fire blending. The third plurality of parameters is directed towards customizing a characteristic, such as, for example, tightening, the entire mass-spring-damper system while the player (or the virtual character) is firing, to make the weapon appear to better align with the virtual character's view vector while shooting. (Note that bullets are technically emitted from the camera and not the gun). In some embodiments, the third plurality of parameters ('Fire' settings) comprises:

Fire duration 440: duration, after firing a bullet, where the system will use the settings of the third plurality of parameters.

Fire start blend duration 442: duration over which to blend to the settings of the third plurality of parameters when starting to fire.

Fire finish blend duration 444: duration over which to blend out of the settings of the third plurality of parameters when the duration 440 has elapsed.

Fire smoothing rate 446: the virtual character's view vector is smoothed at this rate to calculate a base orientation of the virtual character's arms while firing. Units in radians/sec per radian of displacement between current and goal orientation.

Fire torso dead zone scale 448: this parameter scales the torso dead zone by this value while firing.

Fire torso-to-gun scale 450: this parameter scales a final gun orientation (that is, difference between "Gun Mass" and the virtual character's view vector) by this value while firing.

The third plurality of parameters of the GUI 400 enables tuning weapons to have a unique feel per weapon class. Thus, missile launchers feel very heavy and have a slow sway and primarily pivot around the shoulder.

Virtual Camera Movement (VCaM) Module

In various embodiments, the virtual camera movement module or engine 134 implements a plurality of instructions or programmatic code to procedurally animate the virtual camera such that it simulates the movement of a camera handheld by the virtual character. In some embodiments, the module 134 implements the feature of procedural camera animation (or camera shake behavior) by applying coherent noise, such as, for example, Perlin Noise, to each of six axes on a first-person virtual camera—that is, X, Y, and Z axes in translation (forward/backward, left/right, up/down) and Yaw, Pitch, and Roll in rotation. An embodiment uses six octaves of Perlin Noise sampled in one dimension for each of the six camera axes. Alternate embodiments may apply other coherent noise functions such as, for example, Simplex Noise or may use a plurality of layers of sin( ) function.

In accordance with some aspects, the module 134 is configured to sample Perlin Noise for every frame of gameplay, and a value is generated for a time duration corresponding to every frame. The module 134 then directly uses the generated value as an offset to one of the six axes on the local player's (or virtual character's) virtual camera. Persons of ordinary skill in the art would appreciate that a unique characteristic of Perlin Noise is that adjacently sampled values are similar, resulting in smooth transitions from frame to frame, even though it produces overall pseudorandom results. This is known as being a type of coherent noise.

In embodiments, the module 134 is configured to dynamically adjust or modulate one or more of a plurality of parameters (also referred to as 'camera shake parameters') input to the Perlin Noise function. In some embodiments, the plurality of parameters comprises a number of octaves (this value never changes and is always six in each axis, in accordance with some embodiments), amplitude, frequency, and persistence. In some embodiments, amplitude, frequency, and persistence are the parameters that are adjusted or modulated according to what the player (or the virtual character) is doing while playing the game to change the overall camera shake behavior.

In some embodiments, the one or more of the plurality of parameters provided to Perlin Noise calculation are adjusted or modulated in direct proportion to the virtual character's linear and angular velocity in the game. That is, the one or more of the plurality of parameters respond linearly to payer actions. So, for example, sprinting quickly through a game map will create a much faster, stronger, and rougher camera shake than slowly walking through a game level would. As another example, higher movement speed can affect pitch rotational shake roughness more than it would affect roll rotational shake In some embodiments, the one or more of the plurality of parameters can also respond non-linearly to virtual character actions or movements. For example, some of the plurality of parameters will greatly increase when the virtual character accelerates from 10 units per second to 100 units per second but will only increase slightly in the range from 100 units per second to 250 units per second.

In accordance with aspects of the present specification, the one or more of the plurality of parameters can be controlled by graphics artists or designers on a per-axis basis. In some embodiments, the plurality of parameters can alternatively be controlled directly from designer-written game script, for example to add shake to a scene as the virtual character sits in a helicopter on the ground and the helicopter's rotors are spinning up in preparation for takeoff. In this case, the virtual character's velocity does not change but it is still desirable to add camera shake.

In accordance with some aspects of the present specification, the module 134 is configured to generate at least one GUI (Graphical User Interface) to enable a graphics artist or designer to customize one or more parameters, properties or characteristics associated with procedural animation or rotational shake motion of a player's (or virtual character's) virtual camera. The at least one GUI is generated in response to the graphics designer's request through a client game module 130' on his client device 110*g* (FIG. 1).

FIG. 5 shows an exemplary GUI 500 that displays a plurality of customizable parameters associated with procedural animation or rotational shake motion of a player's (or virtual character's) virtual camera, in accordance with some embodiments of the present specification. In some embodiments, the rotational shake motion of the virtual camera mimics a camera handheld by the player (or the virtual character). The GUI 500 displays a checkbox 501 which when checked by a graphics designer enables the module 134 to implement the handheld camera rotational motion of method 600 of FIG. 6 during gameplay.

A first portion 500*a* displays a first plurality of parameters related to the camera rotational shake or motion. In some embodiments, the first plurality of parameters comprises: frequency 502, amplitude 504, persistence/roughness 506 and view-move scale combine mode 508. In some embodiments, the parameter 508 has one of first, second or third attributes/options which correlate to 'maximum', 'average' or 'multiply', respectively. To calculate final values for frequency 502, amplitude 504, and persistence 506, the system independently calculates these values resulting from the virtual character's movement speed (that is, translation speed through the virtual world) and the virtual character's angular view velocity (that is, rotation velocity). Once each of the three parameters 502, 504 and 506 have been calculated from the virtual character's movement speed and angular view velocity, the combine mode 508 is used to determine which or how the values for the three parameters

502, 504 and 506 should be used. Thus, if the first option of 'maximum' is chosen for the parameter 508 then the system uses the maximum of movement speed or angular view velocity for each of the frequency 502, amplitude 504, and persistence 506 parameters. If the second option of 'average' is chosen for the parameter 508 then the system uses an average of movement speed and angular velocity for each of frequency 502, amplitude 504, and persistence 506 parameters. If the third option of 'multiply' is chosen for the parameter 508 then the system multiplies the movement speed and angular view velocity and the resultant value is used for each of frequency 502, amplitude 504, and persistence 506 parameters. Each of the parameters 502, 504, 506 and 508 is configured to have first, second and third values corresponding to pitch, yaw and roll rotational motions.

A second portion 500b displays a second plurality of parameters that define modifiers to the frequency 502, amplitude 504 and persistence 506 with virtual character's movement. In some embodiments, the second plurality of parameters comprises:

Modifier 510: this parameter is configured as a drop-down list of options such as, for example, 'speed control' and 'script control'. Under 'speed control', the virtual character's movement speed/velocity is used to control the frequency 502, amplitude 504 and persistence 506 values. Under 'scrip control', arbitrary game logic can directly supply values to the system. That is, scripters can choose to increase shake intensity as a stationary helicopter's rotors begin to spin, for example.

Non-linear map 512: this parameter controls if the second plurality of parameters respond non-linearly to virtual character movement. In some embodiments, RumbleGraph assets are used to define non-linear mapping of the second plurality of parameters to a virtual character's movement. RumbleGraph assets determine how the system expresses the non-linear mapping in [0, 1] in the X-axis to [0, 1] in the Y-axis.

In speed blend in time 514: when the virtual character's current movement speed is less than a goal movement speed, the blend time 514 is used in a function, such as a type of Exponential Moving Average smoothing function. Increasing the value 514 will make shake parameters change more slowly in response to virtual character motion.

In speed blend out time 516: when the virtual character's current movement speed is greater than the goal movement speed, the blend time 516 is used in a function, such as a type of Exponential Moving Average smoothing function. Increasing the value 516 will make shake parameters change more slowly in response to virtual character motion.

In player move speed 518: inputs to a non-linear map must be in the range [0,1]. The value 518 specifies a maximum movement speed to use so that a value can be calculated in that range from the virtual character's current movement speed. That is, the virtual character's current movement speed divided by the 'in player move speed' 518 is the value that will be used as the input to the non-linear map. Setting high values 518 above the virtual character's maximum speed in-game may result in the maximum frequency 502, amplitude 504 and persistence 506 values never being achieved. This value 518 should generally be set to the virtual character's maximum expected speed in-game.

Out frequency scale 520: from its input, the non-linear map produces an output value in [0,1]. The output value is multiplied against the value of the parameter 520 to produce a final frequency scale value to use for sampling Perlin Noise. Higher values result in faster shaking.

Out amplitude scale 522: from its input, the non-linear map produces an output value in [0,1]. The output value is multiplied against the value of the parameter 522 to produce a final amplitude scale value to use for sampling Perlin Noise. Higher values of the parameter 522 result in greater shake amplitude (larger overall movement on screen).

Out persistence scale 524: from its input, the non-linear map produces an output value in [0,1]. The output value is multiplied against the value of the parameter 524 to produce a final persistence scale value to use for sampling Perlin Noise. Higher values of the parameter 524 result in rougher shake, in other words, less smooth and with more high-frequency detail.

Out blend in time 526 and Out blend out time 528: parameters 526, 528 are similar to the parameters 514, 516, respectively, but control the blend in/out speed of a resulting current frequency scale, amplitude scale, and persistence scale values calculated from the virtual character's movement speed. For example, if a previous amplitude scale value was 1.1, and a current frame's goal amplitude scale value is 1.3 (calculated via the virtual character's current movement speed mapped through the RumbleGraph nonlinear function), the blend in time value 526 would be used to blend the previous amplitude scale value toward the goal. In other words, even though the current frame's goal amplitude scale is 1.3, the final amplitude scale value for the current frame may actually be about 1.2 since the blend in time 526 needs to be respected. This will allow for another method of smoothing out rapid changes in amplitude, frequency, and persistence.

A third portion 500c displays a second plurality of parameters that define modifiers to the frequency 502, amplitude 504 and persistence 506 with virtual character view vector orientation movement. In some embodiments, the third plurality of parameters comprises:

Modifier 530: this parameter is configured as a drop-down list of options such as, for example, 'speed control' and 'script control'. Under 'speed control' the virtual character's angular view speed/velocity is used to control the frequency 502, amplitude 504 and persistence 506 values. Under 'scrip control', arbitrary game logic can directly supply values to the system.

Non-linear map 532: this parameter controls if the third plurality of parameters respond non-linearly to virtual character view orientation movement. In some embodiments, RumbleGraph assets are used to define non-linear mapping of the third plurality of parameters to a virtual character's view orientation movement or angular view velocity. RumbleGraph assets determine how the system expresses the non-linear mapping in [0, 1] in the X-axis to [0, 1] in the Y-axis.

In speed blend in time 534: when the virtual character's current angular view velocity is less than a goal angular view velocity, the blend time 534 is used in a function, such as a type of Exponential Moving Average smoothing function. Increasing the value 534 will make shake parameters change more slowly in response to virtual character view rotation.

In speed blend out time 536: when the virtual character's current angular view velocity is greater than the goal angular view velocity, the blend time 536 is used in a function, such as a type of Exponential Moving Average smoothing function. Increasing the value 536 will make shake parameters change more slowly in response to virtual character view rotation.

In player view speed 538: inputs to the non-linear map must be in the range [0, 1]. The value 538 specifies a maximum angular view velocity to use so that a value can be calculated in that range from the virtual character's current angular view velocity. That is, the virtual character's current angular view velocity divided by the 'in player move speed' 538 is the value that will be used as an input to the non-linear map. Setting high values 538 above the virtual character's angular view velocity in-game may result in the maximum frequency 502, amplitude 504 and persistence 506 values never being achieved. This value 538 should generally be set to the virtual character's maximum expected angular view velocity in-game.

Out frequency scale 540: from its input, the non-linear map produces an output value in [0,1]. The output value is multiplied against the value of the parameter 540 to produce a final frequency scale value to use for sampling Perlin Noise. Higher values result in faster shaking.

Out amplitude scale 542: from its input, the non-linear map produces an output value in [0,1]. The output value is multiplied against the value of the parameter 542 to produce a final amplitude scale value to use for sampling Perlin Noise. Higher values of the parameter 542 result in greater shake amplitude (larger overall movement on screen).

Out persistence scale 544: from its input, the non-linear map produces an output value in [0,1]. The output value is multiplied against the value of the parameter 544 to produce a final persistence scale value to use for sampling Perlin Noise. Higher values of the parameter 544 result in rougher shake, in other words, less smooth and with more high-frequency detail.

Out blend in time 546 and Out blend out time 548: the parameters 546, 548 are similar to the parameters 526, 528, respectively.

Figure 6:
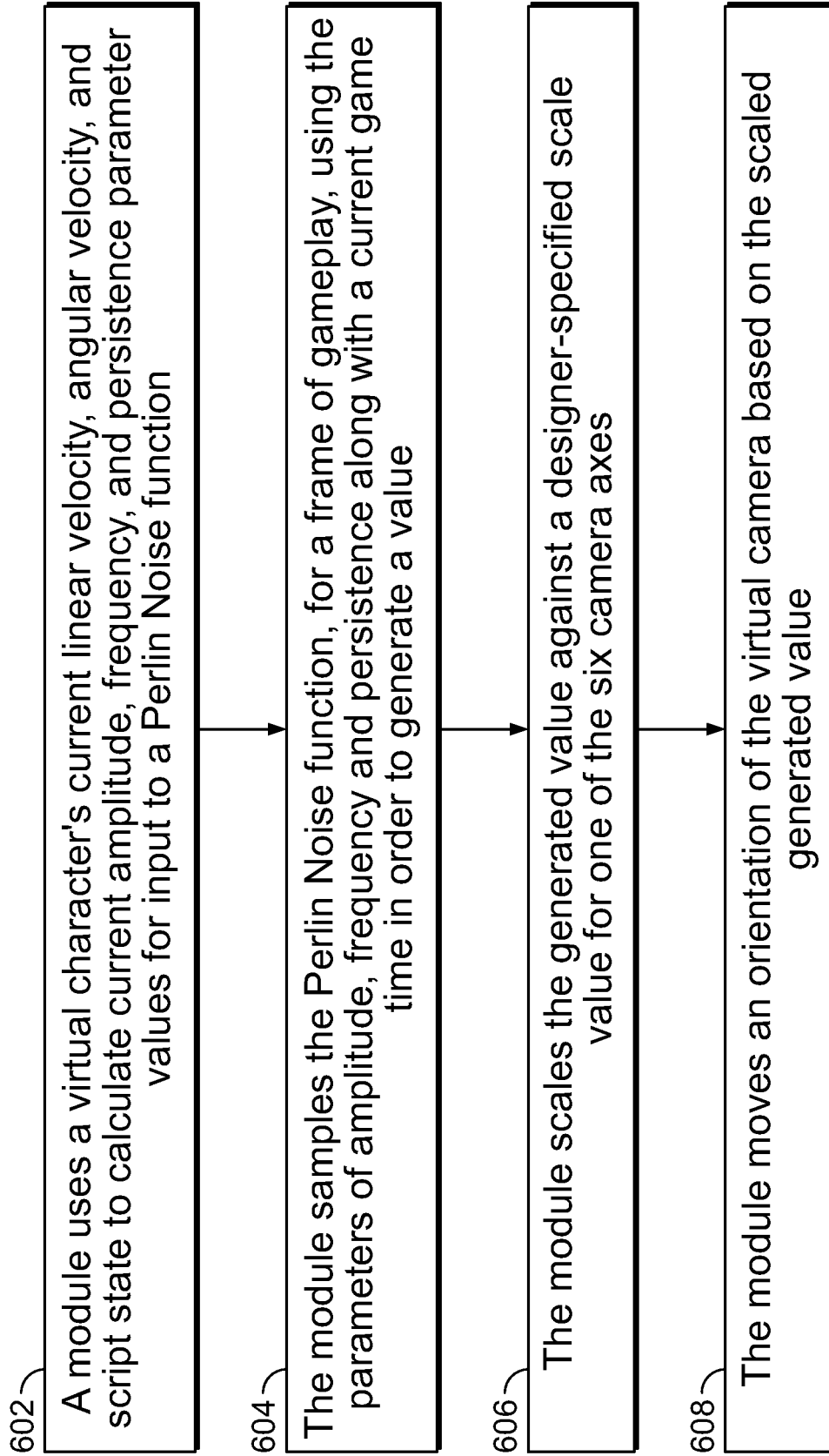
FIG. 6 is a flowchart of a plurality of exemplary steps of a method of imparting procedural animation or shake motion to a handheld virtual camera associated with a virtual character in a video game, in accordance with some embodiments of the present specification.

A Method of Imparting Procedural Animation or Realistic Shake Motion to a Virtual Camera Handheld by a Player/Virtual Character FIG. 6 is a flowchart of a plurality of exemplary steps of a method 600 of imparting procedural animation or shake motion to a handheld virtual camera associated with a virtual character in a video game, in accordance with some embodiments of the present specification. In some embodiments, the method 600 is implemented by the VCaM module 134, in one or more game servers 105, in data communication with a client game module 130' on the player's client device 110 of FIG. 1. As discussed earlier in this specification, the procedural motion of the virtual camera is defined with reference to six camera axes—that is, X, Y, and Z axes in translation (forward/backward, left/right, up/down) and Yaw, Pitch, and Roll in rotation.

At step 602, the module 134 uses the virtual character's current linear velocity, angular velocity, and 'script state' to calculate current amplitude, frequency, and persistence parameter values for input to a Perlin Noise function. 'Script state' implies that the module 134 is configured to utilize one or more events or states in gameplay itself to directly affect the camera shake motion. This is akin to the option of 'script control', for the modifier parameter 510 of FIG. 5, which enables arbitrary game logic (events or states) to directly supply values to the module 134. For example, designers can choose to increase camera shake intensity as a stationary helicopter's rotors begin to spin (game logic, event or state), for example.

At step 604, the module 134 samples the Perlin Noise function, for a frame of gameplay, using the parameters of amplitude, frequency and persistence along with a current 'game time' in order to generate a camera angular offset value in one axis (one dimension). An embodiment uses six octaves of Perlin Noise sampled in a dimension.

At step 606, the module 134 scales the generated value against a designer-specified scale value for one of the six camera axes. That is, the generated value is used as an offset to one of the six axes on the virtual character's virtual camera.

The steps 602, 604 and 606 are repeated for imparting procedural animation or camera shake motion to each of the remaining five camera axes.

Finally, at step 608, the module 134 moves an orientation of the virtual camera based on the scaled generated value.

The above examples are merely illustrative of the many applications of the system of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. A method of animating a movement of a virtual camera held by a virtual character in a video game, wherein the video game is adapted to be executed in a video game console and wherein the video game console is in data communication with at least one server, wherein the virtual camera is configured to view gameplay from a first-person perspective and wherein the animated movement is defined in six axes of motion of the virtual camera, the method being implemented by the at least one server executing a plurality of programmatic instructions and comprising:

determining at least a first parameter value, a second parameter value and a third parameter value, wherein each of the first parameter value, the second parameter value and the third parameter value is determined based on actions taken by the virtual character during the gameplay that would affect the virtual camera's movement and wherein at least one of the first parameter value, second parameter value, or third parameter value is modulated in direct proportion to the virtual character's velocity in the gameplay;

generating a value by sampling a noise function, for a frame of gameplay of the video game, using the first parameter value, the second parameter value, the third parameter value, and data indicative of time;

scaling the generated value against a predefined scale value for one of the six axes of motion of the virtual camera;

repeating the steps of determining, generating and scaling for each of the six axes of motion of the virtual camera; and rendering the animated movement of the virtual camera in the video game as the video game executes in said video game console based on the scaled generated values.

2. The method of claim 1, wherein the first parameter value corresponds to an amplitude, the second parameter value corresponds to a frequency and the third parameter corresponds to persistence.

3. The method of claim 1, wherein the first parameter value, the second parameter value and the third parameter values are each determined based on at least one of the virtual character's linear velocity, angular velocity, or one or more events in the video game.

4. The method of claim 1, wherein the first parameter value, the second parameter value and the third parameter value each have a linear relationship with the virtual character's linear and angular velocities.

5. The method of claim 1, wherein at least one of the first parameter value, the second parameter value or the third parameter value have a non-linear relationship with the virtual character's linear and angular velocities.

6. The method of claim 1, wherein the noise function is a Perlin noise function and further comprising sampling six octaves of Perlin noise in one dimension for each of the six axes of motion of the camera.

7. The method of claim 1, further comprising defining the animated movement with reference to x, y, and z axes in translational motion and with reference to yaw, pitch, and roll in rotational motion.

8. The method of claim 1, wherein the generated value is applied as an offset to one of the six axes of motion of the camera.

9. The method of claim 1, further comprising generating at least one graphical user interface that displays a first plurality of parameters directed towards customizing a rotational motion of the virtual camera, and a second plurality of parameters directed towards customizing the first parameter value, the second parameter value and the third parameter value.

10. The method of claim 9, wherein the first plurality of parameters include at least one of an amplitude, a frequency, a persistence or a view-move scale combine mode, and wherein the second plurality of parameters include at least one of a modifier, a non-linear map, an in speed blend in time, an in speed blend out time, an in player move speed, an out frequency scale, an out amplitude scale, an out persistence scale, an out blend in time or an out blend out time.

11. A computer readable non-transitory medium comprising a plurality of executable programmatic instructions wherein, when said plurality of executable programmatic instructions are executed by a processor in a computing device, a process for animating a movement of a virtual camera in a video game is performed, wherein the video game is adapted to be executed in a video game console, wherein the video game console is in data communication with at least one server, wherein said virtual camera is carried by a player's virtual character in the video game, wherein said virtual camera is configured to view gameplay from a first-person perspective, and wherein said animated movement is defined in six axes of motion of the virtual camera, the plurality of executable programmatic instructions being executed in the at least one server and comprising:

programmatic instructions, stored in said computer readable non-transitory medium, for determining at least a first parameter value, a second parameter value and a third parameter value, wherein each of the first parameter value, the second parameter value and the third parameter value is determined based on actions taken by the virtual character during the gameplay that would affect the virtual camera's movement and wherein at least one of the first parameter value, second parameter value, or third parameter value is modulated in direct proportion to the virtual character's velocity in the gameplay;

programmatic instructions, stored in said computer readable non-transitory medium, for generating a value by sampling a noise function, for a frame of the video game, using the first parameter value, the second parameter value, the third parameter value, and data indicative of time;

programmatic instructions, stored in said computer readable non-transitory medium, for scaling the generated value against a predefined scale value for one of the six axes of motion of the virtual camera;

programmatic instructions, stored in said computer readable non-transitory medium, for repeating said steps of calculating, generating and scaling for each of the virtual camera axes; and programmatic instructions, stored in said computer readable non-transitory medium, for rendering the animated movement of the virtual camera in the video game as the video game executes in said video game console based on the scaled generated values.

12. The computer readable non-transitory medium of claim 11, wherein the first parameter value corresponds to amplitude, the second parameter value corresponds to frequency and the third parameter corresponds to persistence.

13. The computer readable non-transitory medium of claim 11, wherein the first parameter value, the second parameter value and the third parameter values are each determined based on the virtual character's linear velocity, angular velocity, and one or more events in the video game.

14. The computer readable non-transitory medium of claim 11, wherein the first parameter value, the second parameter value and the third parameter values each have a linear relationship with the virtual character's linear and angular velocities.

15. The computer readable non-transitory medium of claim 11, wherein at least one of the first parameter value, the second parameter value or the third parameter values has a non-linear relationship with the virtual character's linear and angular velocities.

16. The computer readable non-transitory medium of claim 11, wherein said noise function is a Perlin noise function and further comprising programmatic code for sampling six octaves of Perlin noise for each of said six camera axes.

17. The computer readable non-transitory medium of claim 11, wherein said animated movement is defined with reference to x, y, and z axes in translation motion and with reference to yaw, pitch, and roll in rotational motion.

18. The computer readable non-transitory medium of claim 11, wherein the generated value is applied as an offset to one of the six axes of motion of the virtual camera.

19. The computer readable non-transitory medium of claim 11, further comprising programmatic code for generating at least one graphical user interface that displays a first plurality of parameters directed towards customizing rotational motion of the virtual camera, and a second plurality of parameters directed towards customizing each of the first, second and third parameter values.

20. The computer readable non-transitory medium of claim 11, wherein the first plurality of parameters include amplitude, frequency, persistence and view-move scale combine mode, and wherein the second plurality of parameters include modifier, non-linear map, in speed blend in time, in speed blend out time, in player move speed, out frequency scale, out amplitude scale, out persistence scale, out blend in time and out blend out time.

* * * * *